(12) United States Patent
Cooke et al.

(10) Patent No.: US 7,964,164 B2
(45) Date of Patent: Jun. 21, 2011

(54) PROCESS FOR RECOVERING TITANIUM DIOXIDE

(75) Inventors: Graham Cooke, Chingford (GB); Animesh Jha, Leeds (GB); Abhishek Lahiri, Leeds (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 12/561,855

(22) Filed: Sep. 17, 2009

(65) Prior Publication Data

US 2010/0086454 A1 Apr. 8, 2010

(51) Int. Cl.
C01G 3/00 (2006.01)
(52) U.S. Cl. ............... 423/82; 423/84; 423/85; 423/21.1
(58) Field of Classification Search ............... 423/82, 423/84, 85, 21.1
See application file for complete search history.

(56) References Cited

U.S. PATENT DOCUMENTS

| 1,911,396 | A * | 5/1933 | Saklatwalla et al. | 423/71 |
|---|---|---|---|---|
| 5,011,666 | A * | 4/1991 | Chao et al. | 423/82 |
| 7,494,631 | B2 * | 2/2009 | Jha et al. | 423/81 |
| 7,771,679 | B2 * | 8/2010 | Jha et al. | 423/80 |
| 2008/0241026 | A1 * | 10/2008 | Jha et al. | 423/81 |

FOREIGN PATENT DOCUMENTS

| WO | 91/17956 | * | 11/1991 |
|---|---|---|---|
| WO | WO 91/17956 A | | 11/1991 |
| WO | 2005/028369 | * | 3/2005 |
| WO | WO 2005/028369 A | | 3/2005 |
| WO | WO 2008/118527 A | | 10/2008 |
| WO | PCT/GB2009/051209 | | 11/2009 |

OTHER PUBLICATIONS

Banwart et al., "The Role of Oxalate in Accelerating the Reductive Dissolution of Hematite (x-$Fe_2O_3$) by Ascorbate", Colloids and Surfaces, 39, Elsevier Science Publishers B.V., 1989, pp. 303-309.
Suter et al., "Dissolution of Hydrous Iron(III) Oxides by Reductive Mechanisms", Langmuir, Institute for Aquatic and Water Pollution Control (EAWAG), 1991, pp. 809-813.
Sibum et al., Chapter 22—"Titanium" from "Handbook of Extractive Metallurgy", Wiley-VCH, 1997, pp. 1129-1180.
Panias D et al: "Dissolution of hematite in acidic oxalate solutions: the effect of ferrous ions addition" Hydrometallurgy, Nov. 1, 1996, pp. 219-230, vol. 43, No. 1, Elsevier Science Publishers B.V., Amsterdam, NL.

* cited by examiner

Primary Examiner — Steven Bos
(74) Attorney, Agent, or Firm — Dunlap Codding, P.C.

(57) ABSTRACT

An improved process for recovering a titanium dioxide product from a titanium oxide-containing roasted mass of the type derived from roasting an ilmenite, anatase or perovskite ore by exploiting an organic acid, such as mixture of oxalic acid and ascorbic acid.

18 Claims, 16 Drawing Sheets

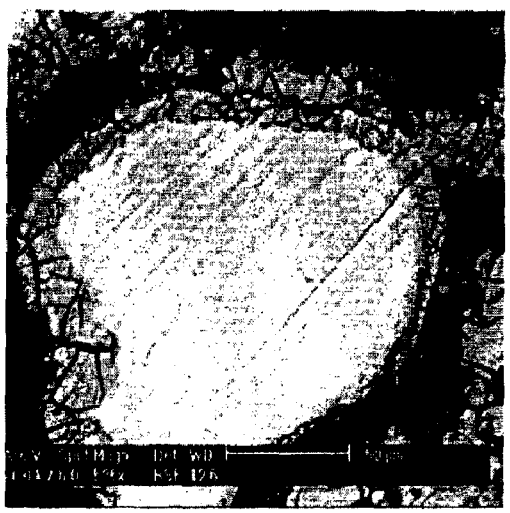
FIG. 18
FIG. 21a
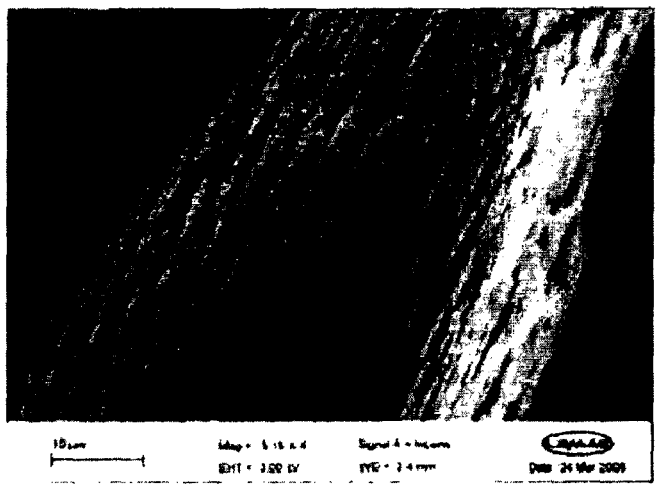
FIG. 21b
FIG. 21

PROCESS FOR RECOVERING TITANIUM DIOXIDE

CROSS-REFERENCE TO RELATED APPLICATION

This application claims priority from United Kingdom Patent Application No. 0817021.9; filed on Sep. 17, 2008, which is hereby incorporated by reference in its entirety.

BACKGROUND OF THE INVENTION

The present invention relates to a process for recovering a titanium dioxide product from a titanium oxide-containing roasted mass, and, more particularly, to a process improvement for recovering a titanium dioxide product from a roasted mass by exploiting an organic acid.

Iron oxides are present in many mineral ores such as mineral ores of chromium, titanium and copper. The removal of iron from these ores is essential for the extraction of the metal and its oxides (Sibum H (1997) Titanium Handbook of Extractive Metallurgy, Weinheim, Wiley-VCH). Various techniques for the removal of iron from the mineral ores have been exploited including reduction roasting, smelting and acid leaching in concentrated hydrochloric acid (see Gueguin M and Cardarelli F (2007) "Chemistry and mineralogy of titania-rich slags. Part 1—Hemo-ilmenite, sulphate, and upgraded titania slags" Mineral Processing and Extractive Metallurgy Review 28(1):1-58; Kahn J A (1984). "Non-Rutile Feedstocks for the Production of Titanium" Journal of Metals 36(7):33-38; and Lasheen T A I (2005). "Chemical beneficiation of Rosetta ilmenite by direct reduction leaching" Hydrometallurgy 76:123-129). However, these techniques are not very efficient in removing iron compounds and they can generate toxic waste (Sibum [supra]; and Doan P (2003). Sustainable development in $TiO_2$ industry: Challenges and Opportunities. $TiO_2$ intertech Miami, Fla.).

WO-A-2005/028369 discloses the recovery of titanium dioxide from a roasted mass using hot water to produce an insoluble residue in aqueous solution. Adding to the aqueous solution a source of alkalinity causes the selective separation of a fine precipitate from which may be recovered metal values including iron compounds. Metal values including iron compounds may also be recovered from the aqueous solution by acidification with a weak organic acid. The insoluble residue may be acid leached in an inorganic acid to remove zirconium, niobium, uranium and thorium compounds.

Iron compounds may be dissolved by treatment with organic acids, such as oxalic acid. Studies have been performed on the dissolution of hematite in oxalic acid (see Panias D Taxiarchou M Douni I Paspaliaris I and Kontopoulos A (1996). "Dissolution of hematite in acidic oxalate solutions: The effect of ferrous ions addition" Hydrometallurgy 43(1-3):219-230) and ascorbic acid (see Suter D, Banwart S and Stumm W (1991) "Dissolution of Hydrous Iron(Iii) Oxides by Reductive Mechanisms" Langmuir 7(4):809-813; and Banwart S, Davies S and Stumm W (1989). "The Role of Oxalate in Accelerating the Reductive Dissolution of Hematite (Alpha-$Fe_2O_3$) by Ascorbate" Colloids and Surfaces 39(4):303-309).

The present invention seeks to improve the recovery of a titanium dioxide product from a titanium oxide-containing roasted mass by exploiting an organic acid to effectively remove iron species (e.g., iron oxide) and alkali metal or alkaline earth metal species from the roasted titanium mineral by leaching.

SUMMARY OF THE INVENTION

Viewed from a first aspect, the present invention is an improved process for recovering a titanium dioxide product from a titanium oxide-containing roasted mass of the type obtained generally from roasting an ilmenite, anatase or perovskite ore. The process comprises:
  (a) subjecting the titanium oxide-containing roasted mass, or a substantially water-insoluble residue thereof, to leaching in an organic acid solution to produce an acid leachate and the titanium dioxide product.

The titanium oxide-containing roasted mass is obtainable by roasting a titanium oxide-containing composition. The titanium oxide-containing composition is a mixture of metal oxide species in compound form or forms which include titania ($TiO_2$). The titanium oxide-containing composition may be synthetic or (preferably) natural, such as a powder, ore or mineral or a mixture thereof. The titanium oxide-containing composition may also be a residue from a chlorination or sulphatation process.

BRIEF DESCRIPTION OF THE DRAWINGS

The present invention will be described in a non-limiting sense with reference to the Examples and accompanying Figs. in which:

FIG. 13a is a microstructure of ilmenite roasted with potassium carbonate and aeration leached.

FIG. 13b is an EDX corresponding to the micrograph of FIG. 13a.

FIG. 17a is a backscattered image of the colloidal layer obtained during water leaching.

FIG. 17b is an EDX of the bright phase in the backscattered image shown in FIG. 17a.

FIG. 17c is an EDX of the grey phase in the backscattered image shown in FIG. 17a.

FIG. 18 is a cross-sectional SEM image of partially reacted ilmenite with a fragmented product layer of potassium titanate/ferrite (roasting temperature 1123K for 60 minutes in air).

FIG. 21 is a cross section of weathered ilmenite grain (a) and final product (b) after limited leaching in an organic acid.

DETAILED DESCRIPTION OF THE INVENTION

Figure 1:
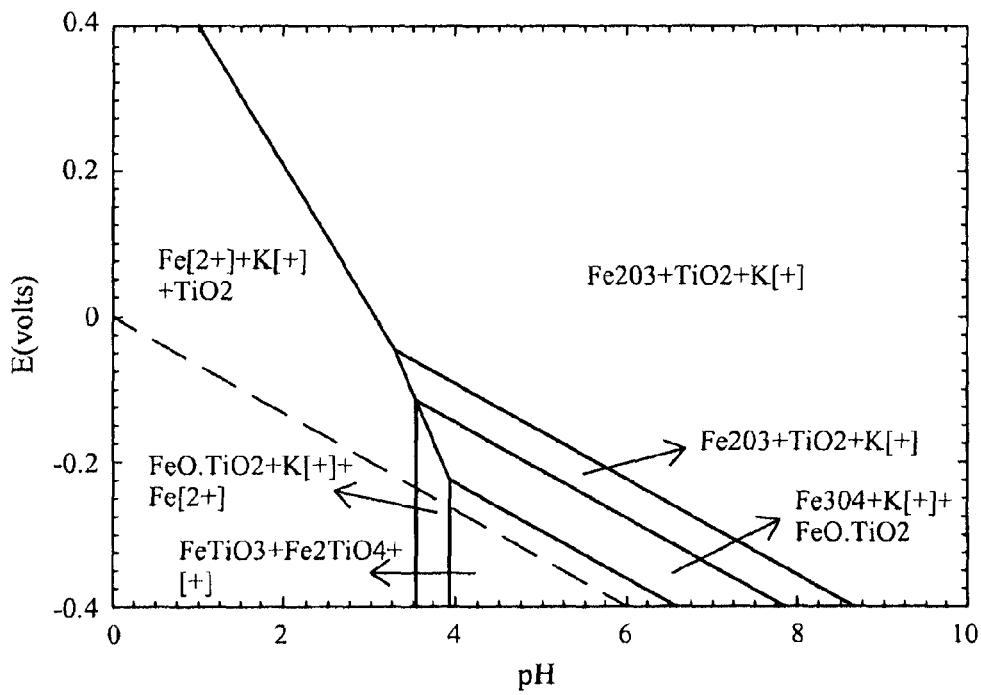
FIG. 1 is an Eh-pH diagram of K—Ti—Fe—O—H at 333K.

The present invention seeks to improve the recovery of a titanium dioxide product from a titanium oxide-containing roasted mass by exploiting an organic acid to effectively remove iron species (e.g., iron oxide) and alkali metal or alkaline earth metal species from the roasted titanium mineral by leaching. The present invention is an improved process for recovering a titanium dioxide product from a titanium oxide-containing roasted mass of the type obtained generally from roasting an ilmenite, anatase or perovskite ore. The process comprises:

(a) subjecting the titanium oxide-containing roasted mass, or a substantially water-insoluble residue thereof, to leaching in an organic acid solution to produce an acid leachate and the titanium dioxide product.

One or more additional steps may be incorporated into the process as described in more detail below. A preferred titanium oxide-containing composition for carrying out the process described herein is a titanium rich material, such as an ore (e.g., ilmenite, anatase, ilmenite beach sands, low grade titaniferous slag, natural rutile or perovskite). The titanium oxide-containing composition may further include at least one iron species, such as a ferrous or ferric species (preferably an iron oxide, such as FeO, $Fe_2O_3$ or $Fe_3O_4$). The titaniferous mixture may further comprise alumina or silica.

According to a preferred embodiment, the titanium oxide-containing composition is an ore selected from the group consisting of ilmenite, anatase, perovskite and mixtures thereof.

Step (a) of the process may be preceded by other preliminary steps:

(a0) providing a titanium oxide-containing composition with one or more alkali salts to produce a charge; and (a01) oxidatively roasting the charge to produce the titanium oxide-containing roasted mass.

Step (a0) may further comprise providing the titanium oxide-containing composition with at least one of an alumina-containing additive and a calcium oxide-containing additive. Although best results have been observed when the charge is without an alumina-containing additive or a calcium oxide-containing additive.

Preferably the one or more alkali salts referred to in step (a0) is one or more alkali metal or alkaline earth metal salts. Preferably the one or more alkali salts is one or more carbonates, hydroxides, bicarbonates or sulphates of a group IA or group IIA metal or a mixture thereof. For example, the one or more alkali salts may be selected from the group consisting of $Na_2CO_3$, $K_2CO_3$, $Na_2SO_4$, $K_2SO_4$, NaOH, $NaHSO_4$, $KHSO_4$, $KHCO_3$, $NaHCO_3$ and KOH. The amount of alkali salt may be calculated based on the formation of alkali compounds of $TiO_2$, $Fe_2O_3$, $Al_2O_3$, $SiO_2$, and $P_2O_5$ present in the composition (e.g., in the ore).

In a preferred embodiment, the one or more alkali salts is a potassium or sodium salt, and most preferably a potassium salt. A potassium salt advantageously promotes removal of iron.

The one or more alkali salts may be a carbonate (e.g., sodium or potassium carbonate).

In a preferred embodiment, the one or more alkali salts is an OH-containing salt. The presence of OH groups promotes the formation of ferrihydrite which facilitates leaching. Most preferred is that the one or more alkali salts is a hydroxide or bicarbonate, and more preferably a hydroxide.

Typically the organic acid solution is a solution of one or more weak organic acids. Weak organic acids are substantially non-dissociative in water. Typically the organic acid solution is without a mineral acid.

Preferably the organic acid solution is a reducing medium. A reducing medium advantageously promotes removal of iron and alkali salt, and most preferably the organic acid solution is capable of reducing Fe(III) to Fe(II).

Preferably the organic acid solution is a solution of a carboxylic (e.g., mono or polycarboxylic), sulphonic or sugar acid (e.g., aldonic, uronic or aldaric acid) or a mixture thereof. Most preferred is that the organic acid solution is a solution of a carboxylic or sugar acid or a mixture thereof.

The carboxylic acid may be a saturated or unsaturated, acyclic (e.g., linear or branched) or cyclic (e.g., monocyclic or polycyclic) carboxylic acid which is optionally substituted (e.g., ring or chain substituted). The carboxylic acid may be aromatic or aliphatic. The carboxylic acid may be a monocarboxylic or polycarboxylic acid. Best results have been observed when the carboxylic acid is a dicarboxylic acid.

The sugar acid is preferably ascorbic acid.

The organic acid solution may be a solution of at least one of the group consisting of benzoic acid, ascorbic acid, formic acid, oxalic acid, citric acid and acetic acid.

In a preferred embodiment, the acid in the organic acid solution is a metal ligand or chelate, and particularly the acid is a ligand or chelate of iron, an alkali metal or alkaline earth metal. Most preferred is that the acid is a ligand or chelate of iron.

In a preferred embodiment, the organic acid solution is a mixture of oxalic acid and ascorbic acid. The concentration of oxalic acid may be in the range 0.1 to 0.3M, preferably in the range 0.15 to 0.25M, and particularly about 0.2M.

The concentration of ascorbic acid may be in the range $7\times10^{-3}$M to $8\times10^{-3}$M, preferably in the range $7.4\times10^{-3}$M to $7.7\times10^{-3}$M, and particularly about $7.55\times10^{-3}$M.

Preferably in step (a) of the process the particles of the titanium oxide-containing roasted mass are in suspension in the organic acid solution. In this embodiment, the dissolution of iron is advantageously controlled by chemical reaction occurring on the surface of the particles. The particles of the titanium oxide-containing roasted mass can be maintained in suspension in the organic acid solution by stirring. Stirring is carried out by a stirrer operating typically at a rate in the range 100 rpm to 2000 rpm, preferably in the range 500 rpm to 1750 rpm, particularly in the range 1000 rpm to 1500 rpm. By way of example, the optimum condition for dissolution has been observed to occur when the solution is stirred by a stirrer operating at about 1300 rpm.

Preferably in step (a) the organic acid solution is at a pH of 4 or less, preferably in the range 2.5 to 4, particularly in the range of 3 to 3.5.

The process may further comprise a step of:

(b) adding an alkaline solution to maintain the pH of the organic acid solution in the range 3 to 4.

In step (b), the alkaline solution may be sodium hydroxide.

Preferably in step (a) the organic acid solution is at an elevated temperature (e.g., in the range of 60° C.-90° C.), particularly about 70° C.

Step (a) may be carried out for a time period in the range 5 to 300 minutes, preferably 100 to 250 minutes (e.g., about 4 hours). The titanium dioxide product may be separated from the acid leachate by any convenient technique, such as by filtration.

Preferably step (a) is carried out anaerobically, i.e., in the presence of an inert gas. For example, argon gas may be passed through the organic acid solution at a convenient rate in the range of 300 ml/min.

Step (a) may be preceded by:

(a02) washing the roasted mass with an aqueous medium to produce an aqueous solution and a substantially insoluble residue of the roasted mass.

The aqueous medium may be water or an alkali solution (e.g., a dilute alkali solution). In step (a02), water-soluble alkali compounds, such as metal (e.g., sodium) aluminate, silicate, ferrite, chromate, vanadate and phosphate may be dissolved in the aqueous medium, and the aqueous medium may be added repeatedly to wash the substantially insoluble residue (typically until the pH of the washings reaches about 7).

Preferably the aqueous solution supports a colloidal layer rich in rare-earth oxides.

The process of the invention may further comprise after step (a02) and before step (a) the steps of:

(a03) isolating the colloidal layer from the aqueous solution; and (a04) recovering the rare-earth oxides from the colloidal layer.

The process may also further comprise after step (b):

(c) washing the titanium dioxide product in a mineral acid, such as HCl, $H_2SO_4$, $HNO_3$ or $H_3PO_4$ (e.g., a mineral acid such as 5% HCl).

The titanium dioxide product is preferably in the form of synthetic rutile or synthetic anatase (or a mixture thereof).

The process of the invention is capable of achieving $TiO_2$ with a purity of 94 wt % or more, and even as high as 97 wt % or more.

A reactor assembly 10 for carrying out the process of the invention as described in the following examples is shown schematically in FIG. 2. The reactor assembly 10 comprises a beaker 12 fitted with a variable speed stirrer 13. A condenser 14 is fitted on the top of beaker 12 to restrict the evaporation of water. The beaker 12 contains a nozzle 15 through which argon gas (Ar) may be passed into a leaching solution 16 to remove oxygen and maintain anaerobic leaching conditions. There are two openings in the beaker 12 for measurement of temperature of the solution by a thermometer 17 and of pH of the solution by a pH probe 18.

EXAMPLE 1

The experiments described in Example 1 compare leaching in oxidizing and reducing media which lead to the production of synthetic rutile having a $TiO_2$ concentration greater than 92 wt %. Unless specified otherwise, the roasted ore upon which the leaching experiments were conducted was prepared in a similar manner to the preparation of $K_2CO_3$ and $Na_2CO_3$ roasted and washed ores referred to specifically below.

Experimental

Figure 2:
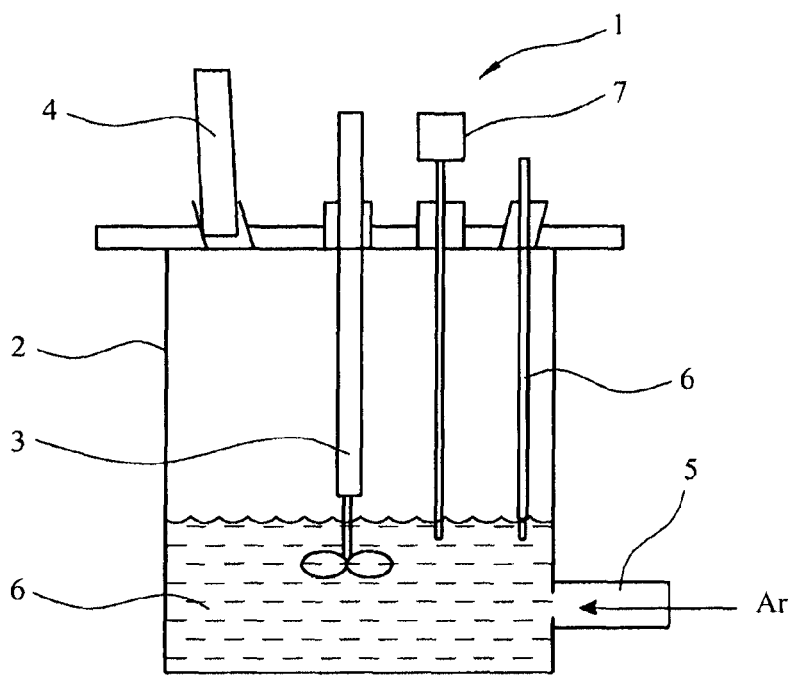
FIG. 2 is a schematic diagram of a reactor assembly for carrying out the described process.

The reactor assembly of FIG. 2 was mounted on a heating mantle, and the temperature was varied between 323K and 353K. Aeration leaching was carried out in a solution of $NH_4Cl$, methanol and acetic acid. Reduction leaching was carried out in a solution of ascorbic acid and oxalic acid.

Figure 6:
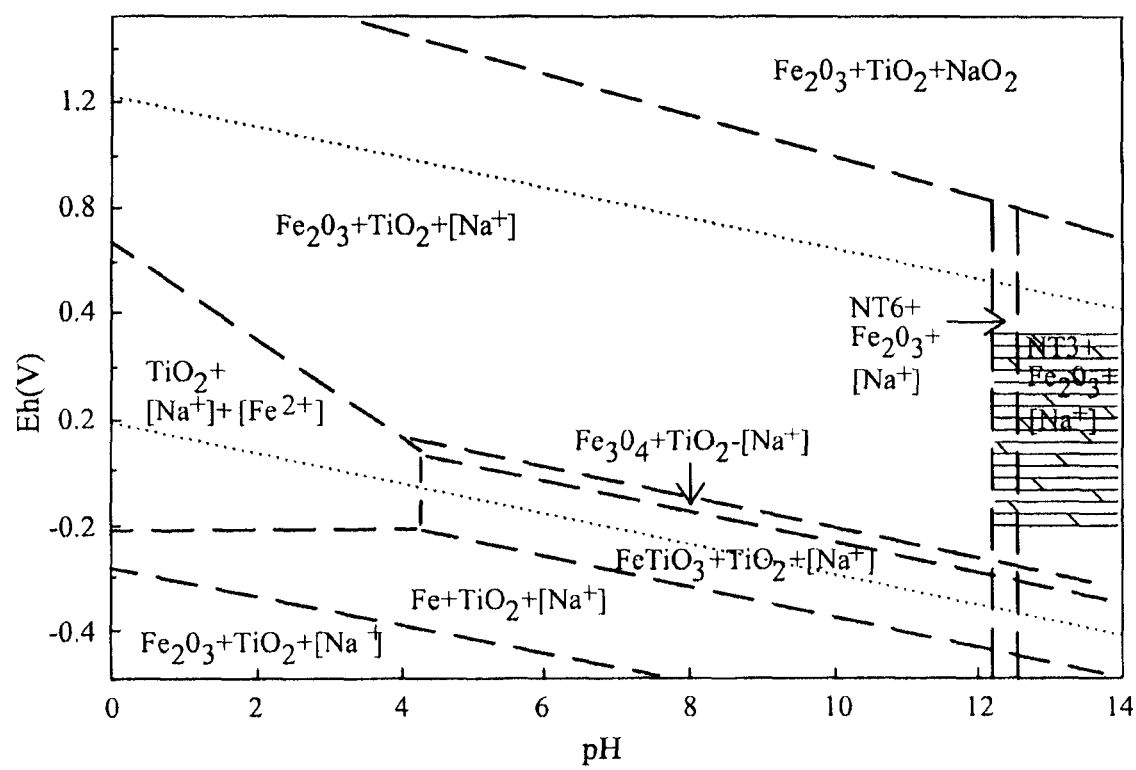
FIG. 6 is an Eh-pH diagram of Na—Fe—Ti—O—H constructed using FACTSAGE thermodynamic software (Bale, C., Pelton, A. D., Thompson, W. D., Melancon, J. and Eriksson, G. FACTSAGE. Ecole Polytechnique CRCT, Montreal, Quebec, Canada).

The principle of leaching is based on the Eh-pH diagram shown in FIG. 6. During leaching, no potential was applied, and the value of hydrogen electrode potential $E_H$ was zero. When the pH of the medium is altered, various phases are likely to form. At zero potential, $Na^+$ ions can be removed from sodium titanate below pH 12. The shaded region beyond pH 12 represents the region which is attained during washing with water. In this region sodium titanate and iron oxide are stable. However there is some recovery of sodium. To recover sodium and remove iron from a roasted ilmenite sample, the pH has to be maintained below 4 which is the shaded area in FIG. 6.

Figure 7:
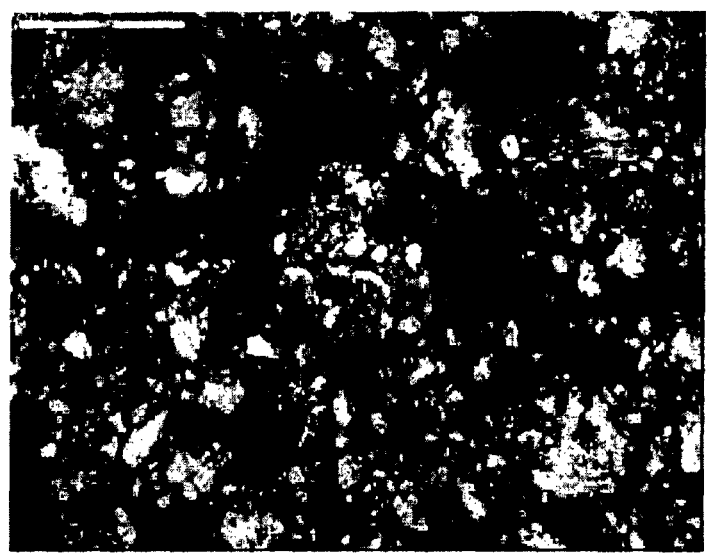
FIG. 7 is a microstructure showing very fine particle precipitation (BSE 300×).

Initial leaching experiments were performed by adding 20% HCl to a beaker with the roasted sample. The solution was stirred at 300 rpm for 4 hours which led undesirably to complete destruction of particle shape and size distribution. The microstructure of the leached sample shown in FIG. 7 exhibited particle segregation into a range of smaller size fractions. The bright phases are zircon and monazite grains and their sodium compounds. The light grey colour phases are Fe—Ti-rich compounds, and the dark grey regions are Ti-rich phases. Impurities, such as zircon and monazite phases, were locked inside the mineral matrix and liberated when the excessive dissolution of alkali occurred in a strong acid medium. The physical liberation of finer zircon and monazite phases is undesirable from the point of view of controlling gravity separation of such minerals. The acid leaching based separation of heavy mineral phases (namely zircon and monazite) is not practically suited against the observation of colloidal medium formed during the water washing of roasted mineral with KOH.

One of the aims of the beneficiation process was to maintain the average particle size greater than 100 micron to permit the product to be used in a fluidised bed chlorination reactor for the production of pigment grade $TiO_2$. If the particle size is lower than 100 microns, the loss due to excessive fluidization during chlorination will increase in the reactor. During leaching with HCl, the pH of the solution increased as the sodium titanate decomposed to sodium ions and titanium dioxide. As the process of leaching in an HCl medium yields $TiO_2$ of nearly 82% purity with varying particle size, a further leaching experiment was carried out with organic solvents in order to control pH of the leaching medium.

Optimization of pH

It was necessary to establish basic conditions under which the pH must be maintained during the leaching process for maximum retention of the shape and size of rutile. Initial assessment of pH control involved using a strong acid (HCl) and a weak acid ($CH_3COOH$).

Figure 8:
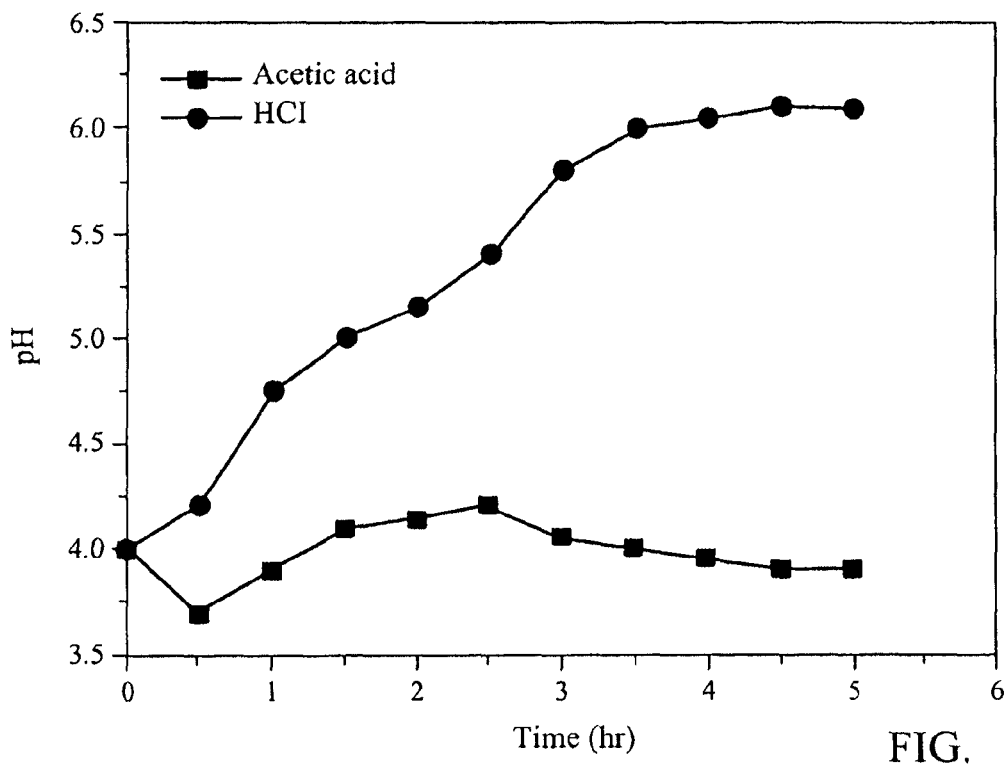
FIG. 8 is a plot comparing the change in pH of the reaction mixture against time when leaching is carried out in an HCl and acetic acid solution.

FIG. 8 compares changes in pH with time when leaching was carried out in 30% HCl and acetic acid solutions. It is evident from FIG. 8 that pH varies between 3.75 and 4.25 in an acetic acid medium. The pH increases to 6 when a mineral acid such as HCl is used. The increase in pH due to the addition of HCl can be attributed to the low concentration of HCl which, when consumed during the leaching stage, results in an increase in pH. After 5 hours leaching with HCl solution, the total iron remaining in the residue was estimated to be 10.56 wt %. The low removal of iron is attributed to the fact that the pH of the medium increased above 5 within 2 hours. This was not the case when acetic acid was used. It is for this reason that removal of iron was better as pH varied between 3.75 and 4.25. After 5 hours, total iron concentration remaining in the residue was 7.5 wt %. The analysis of iron after 4 hours was found to be marginally higher than after 5 hours, and this time was considered therefore to be optimum. The main inference from this experiment is that control of pH is essential for maintaining the removal of iron and alkali salt.

Figure 9:
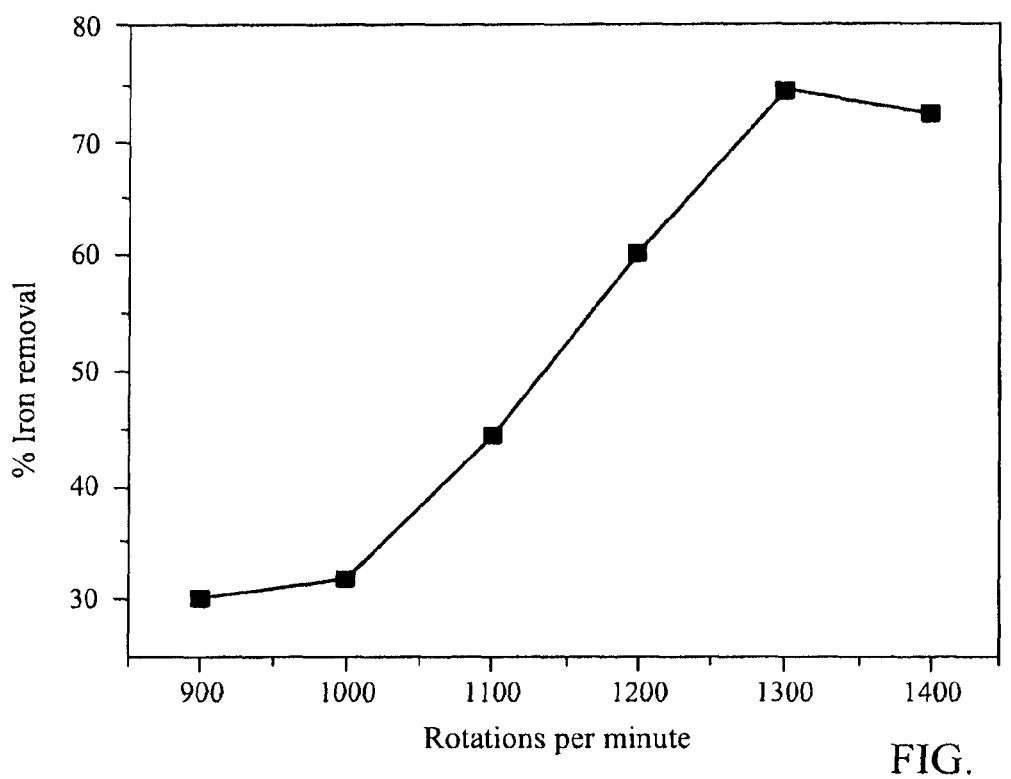
FIG. 9 is a plot showing percentage removal of iron with different stirring speeds.

Aeration Leaching 30 grams of roasted material were suspended in a 500 ml beaker containing 1.5% (w/v) $NH_4Cl$ and 0.5% (v/v) methanol solution. Acetic acid was added to the solution, and the pH was adjusted to 3. To keep the roasted particles suspended, the solution was stirred at constant speed. During leaching, air flow was maintained at a constant rate of 0.5 lit/min. It is evident from FIG. 9 that better removal of iron was achieved with increased stirring speed which reached a maximum when the solution was stirred at 1300 rpm. This increase is attributed to a higher suspension volume when the stirring speed is increased from 900 rpm to 1300 rpm. Under these conditions the surface area of the chemical reaction increases and leads to high removal of iron. However, it can be seen that at 1400 rpm, removal of iron has decreased slightly. This was because some particles accumulated on top of the beaker and had to be constantly reintroduced into the medium.

Removal of Iron and Sodium

Figure 10:
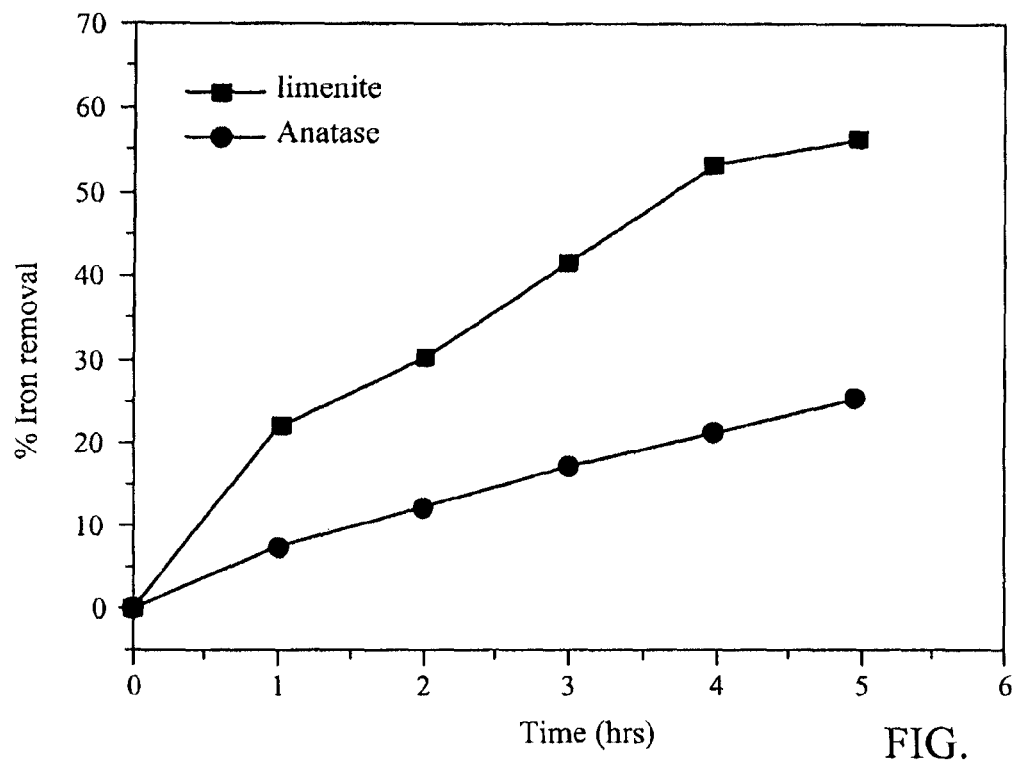
FIG. 10 is a plot showing percentage removal of iron with time when roasted ilmenite and anatase is aeration leached.
Figure 11:
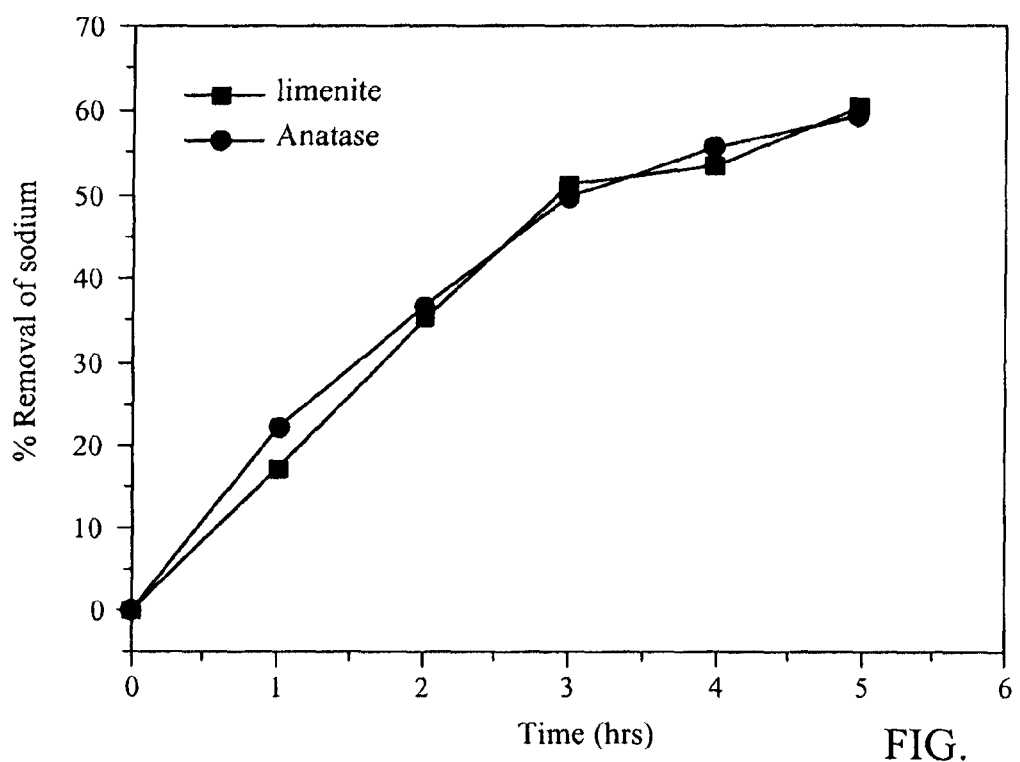
FIG. 11 is a plot showing percentage removal of sodium with time when roasted ilmenite and anatase is aeration leached.

During leaching, samples were collected for analysis of total iron and sodium present in the solution. FIGS. 10 and 11 are plots of percentage removal of iron and sodium, respectively, when roasted ilmenite and anatase minerals were treated via aeration leaching.

It is evident from FIG. 10 that removal of iron from roasted ilmenite is higher than from anatase. This is because anatase has comparatively less iron oxide present in the mineral lattice. The kinetics of leaching for ilmenite for the first hour are fast but slow down with time. The total removal of iron from ilmenite after 5 hours was about 57 wt %. The removal of iron from roasted anatase ore is almost linear and at the end of 5 hours only 20 wt % of iron was removed.

Similar observations were made in the removal of sodium ions from the roasted material (see FIG. 11). In the first 3 hours, the rate of removal of $Na^+$ ions was much faster than between 4 and 5 hours where the reaction tended to plateau. However for both ilmenite and anatase the removal of sodium ions was around 60 wt %. Table 1 compares the chemical composition of ilmenite and anatase minerals after the beneficiation steps of roasting and leaching.

TABLE 1

Chemical composition of ilmenite and anatase ores after roasting followed by aeration leaching at T = 25° C., atm = $O_2$ at 500 ml $min^{-1}$

| Constituents | Ilmenite ore | Anatase ore | Aeration leached ilmenite | Aeration leached anatase |
|---|---|---|---|---|
| $TiO_2$ | 69.2 | 56.3 | 70.89 | 69.58 |
| FeO | 15.2 | 0 | 0 | 0 |
| $Fe_2O_3$ | 6.1 | 18.4 | 7.7 | 8.8 |
| $Na_2O$ | 0 | 0 | 15.62 | 15.89 |
| $Al_2O_3$ | 2.4 | 6.8 | 1.15 | 1.16 |
| $Cr_2O_3$ | 0.2 | 0.2 | 0.13 | <0.01 |
| $Mn_3O_4$ | 0.4 | 0.35 | 0.11 | 0.2 |
| CaO | 0.1 | 1.7 | 0.01 | 0.35 |
| $SiO_2$ | 3.8 | 3.9 | 0.35 | 0.80 |
| $P_2O_5$ | 0.3 | 1.6 | 0.02 | 1.01 |
| $La_2O_3$ | 0.3 | 0.6 | 0.12 | 0.04 |
| $CeO_2$ | 0.7 | 1.6 | 0.33 | 0.28 |

Figure 12:
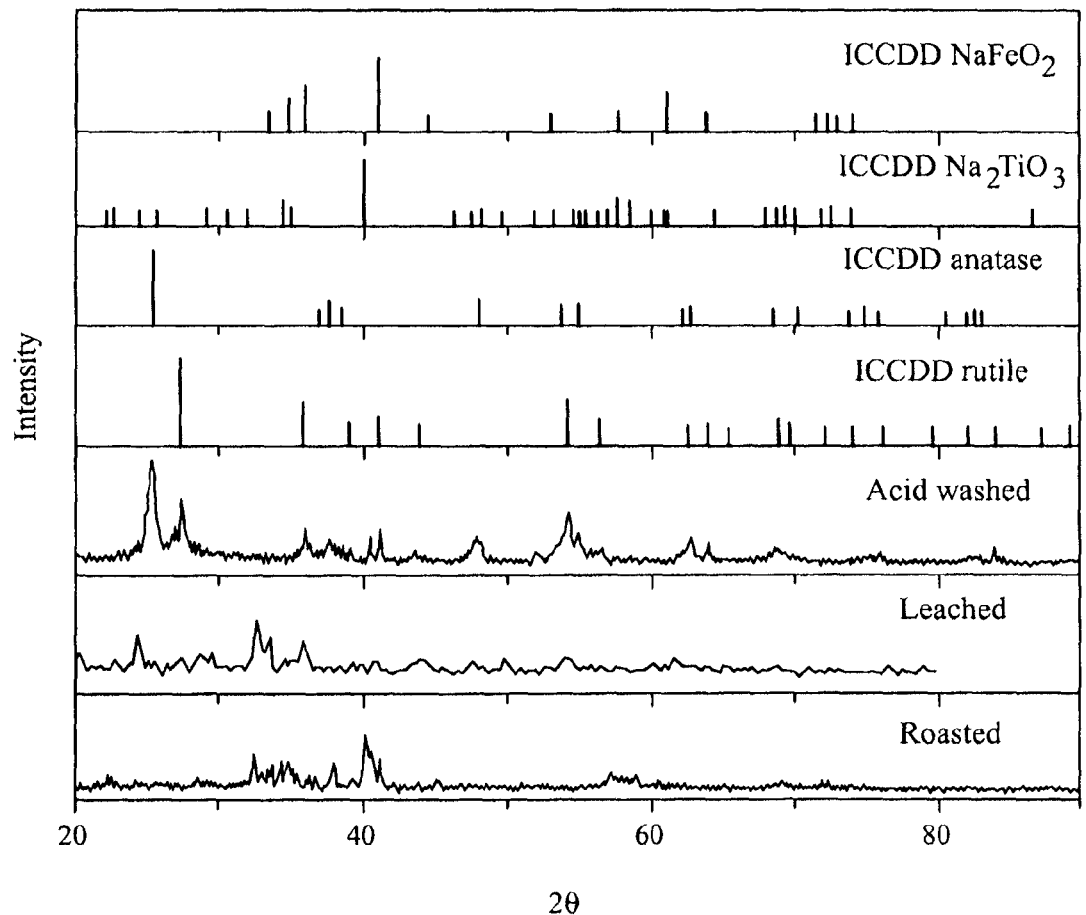
FIG. 12 illustrates diffraction patterns showing synthetic rutile and anatase obtained after the beneficiation of ilmenite ore.

It is evident from Table 1 that $TiO_2$ concentration for anatase has increased from 56 wt % to 69 wt %. There is little difference in the $TiO_2$ concentration between untreated ilmenite and the roasted and leached sample. Although significant amounts of sodium were recovered in the water washing and leaching stages, it was confirmed by chemical analysis that the ores contained a little over 15 wt % of sodium oxide. To remove the remaining sodium oxide, an acid treatment was performed with 4M HCl solution. FIG. 12 compares the diffraction patterns after roasting, aeration leaching and acid leaching from which it is evident that beneficiated material contains both rutile and anatase. After aeration leaching, anatase and rutile peaks start growing. However, peaks of sodium titanate and ferrite were present and therefore acid leaching was needed.

Given that the concentration of constituents below 5 wt % cannot be detected from XRD analysis, verification was necessary using chemical analysis. Table 2 compares the chemical composition of the ores after acid treatment. It is evident that $TiO_2$ concentration increased to 91 wt % for ilmenite and 88 wt % for anatase. Furthermore the concentration of rare earth oxides and phosphorus pentoxide decreased from the concentration present in the mineral. Similar experiments were performed when ilmenite and anatase were roasted with potassium and lithium carbonate. As lithium carbonate forms more stable titanates and ferrites than those formed with $Na^+$ and $K^+$ ions, leaching of lithium titanates resulted in no removal of iron or lithium. However, when leaching was performed with a roasted sample treated with potassium carbonate, the results were similar to those for sodium.

TABLE 2

Chemical composition of beneficiated ilmenite and anatase ores (T = 25° C.) via oxidative leaching and acid washing with 4M HCl

| Constituents | Ilmenite ore | Anatase ore | Acid washed ilmenite with 4M HCl | Acid washed anatase with 4M HCl |
|---|---|---|---|---|
| $TiO_2$ | 69.2 | 56.3 | 91.1 | 88.3 |
| FeO | 15.2 | 0 | 0 | 0 |
| $Fe_2O_3$ | 6.1 | 18.4 | 4.8 | 5.42 |
| $Na_2O$ | 0 | 0 | 3.68 | 3.87 |

TABLE 2-continued

Chemical composition of beneficiated ilmenite and anatase ores
(T = 25° C.) via oxidative leaching and acid washing with 4M HCl

| Constituents | Ilmenite ore | Anatase ore | Acid washed ilmenite with 4M HCl | Acid washed anatase with 4M HCl |
|---|---|---|---|---|
| $Al_2O_3$ | 2.4 | 6.8 | 1.15 | 1.2 |
| $Cr_2O_3$ | 0.2 | 0.2 | 0.03 | <0.01 |
| $Mn_3O_4$ | 0.4 | 0.35 | 0.08 | 0.2 |
| CaO | 0.1 | 1.7 | 0.01 | 0.35 |
| $SiO_2$ | 3.8 | 3.9 | 0.25 | 0.60 |
| $P_2O_5$ | 0.3 | 1.6 | 0.02 | 1.01 |
| $La_2O_3$ | 0.3 | 0.6 | 0.12 | 0.04 |
| $CeO_2$ | 0.7 | 1.6 | 0.21 | 0.2 |

Figure 13:
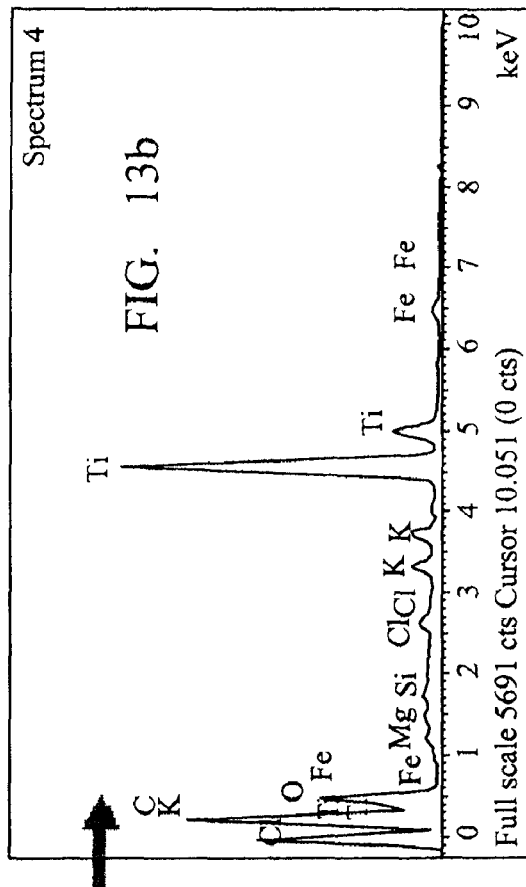
Figure 13:
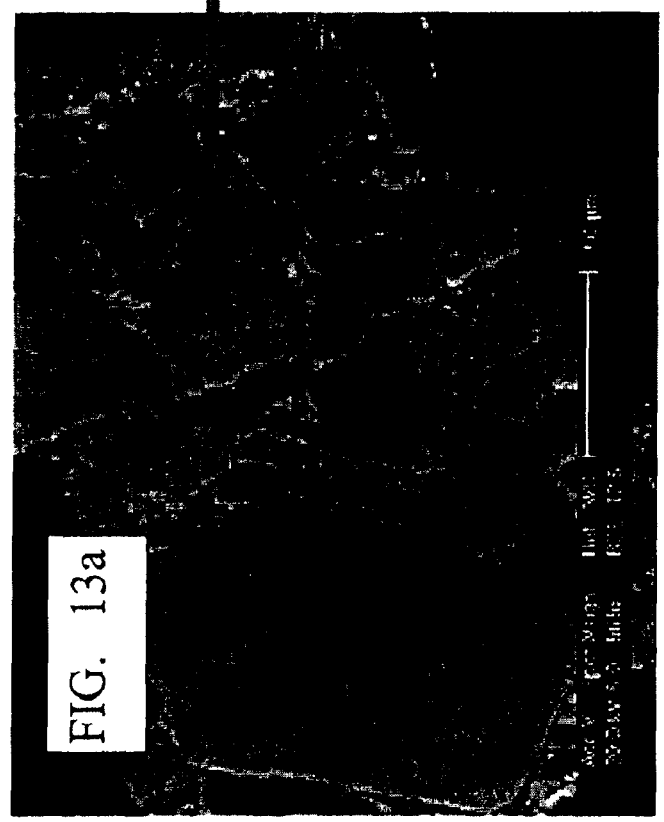

The microstructure of the beneficiated mineral after roasting with potassium carbonate and aeration leaching is shown in FIG. 13a. The micrograph shows the segregated particles which occur due to breakage of the lattice in the presence of potassium ions. The EDX in FIG. 13b confirms the presence of titanium dioxide with smaller peaks of potassium, iron, magnesium and silicon. Chlorine is present due to the acid leaching with HCl.

Aeration leaching is a successful method for recovering alkali ions as well as removing iron remaining after roasting.

Leaching in a Reducing Medium

The main aim of leaching is to recover most of the alkali salts and to remove impurities, such as iron oxide. The $E_H$-pH diagram in FIG. 6 indicates that below pH 4, $Fe^{2+}$ and $Na^+$ ions are produced whereas $TiO_2$ is stable. Therefore, leaching experiments were performed in reducing medium to convert the $Fe^{3+}$ ions which were generated during oxidation roasting to $Fe^{2+}$ ions. This was achieved using the setup shown in FIG. 2 by the addition of ascorbic acid which acted as a reducing agent. The reaction mechanism for the reduction leaching was studied in detail by spectroscopy.

(1) $K_2CO_3$ Roasted Ore

From FIG. 1, it is evident that below a pH of 4 iron and potassium exists in the ionic form whereas $TiO_2$ is stable. Therefore by controlling the pH of the medium it is possible to recover titanium dioxide from the roasted mass.

Ilmenite ore was roasted with a stoichiometric proportion of $K_2CO_3$ at 1148K for 4 hours. The roasted mass was then washed in water to remove all soluble potassium ferrites, silicates and aluminates. The substantially insoluble residue that remained after washing was then subjected to leaching in a solution of oxalic and ascorbic acid in reactor assembly 10 illustrated in FIG. 2. As the stirring rate and the pH were already optimised in the aeration leaching process, these parameters were unchanged. The pH of the solution was maintained by oxalic and ascorbic acid which, being weak acids, dissociate slowly and therefore maintain the pH below 4 throughout the leaching process. The pH of the solution was adjusted to 3 by the addition of NaOH. The temperature was varied between 333K and 363K. The best result was obtained when leaching was performed at 343K beyond which the particles broke into very small fragments having particle size of less than 75 μm. The solution was stirred at a constant rate of 1300 rpm, and argon gas was passed into the solution at 300 ml min$^{-1}$. Leaching was carried out for 4 hours after which the residue was filtered and washed with 5% HCl solution.

Figure 3:
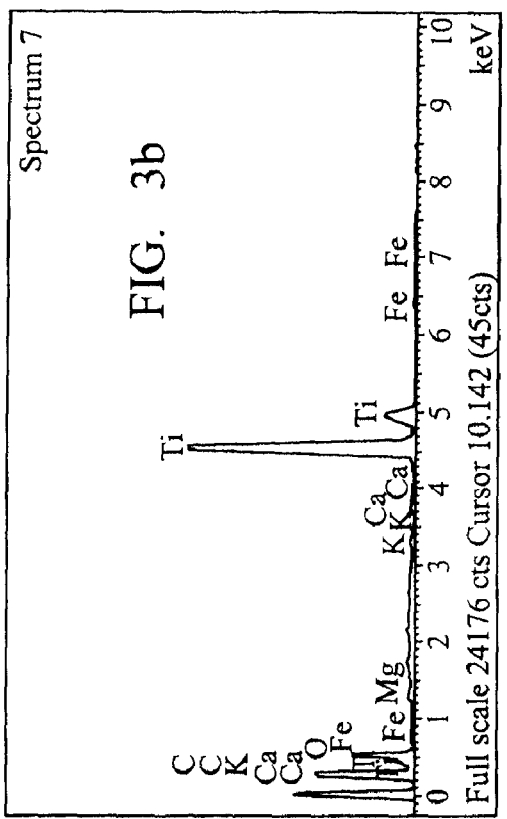
FIG. 3a is a backscattered image of ilmenite grain after roasting with potassium carbonate followed by reduction leaching.
FIG. 3b is an EDX of the ilmenite grain of FIG. 3a confirming the presence of titanium and oxygen.
Figure 3:
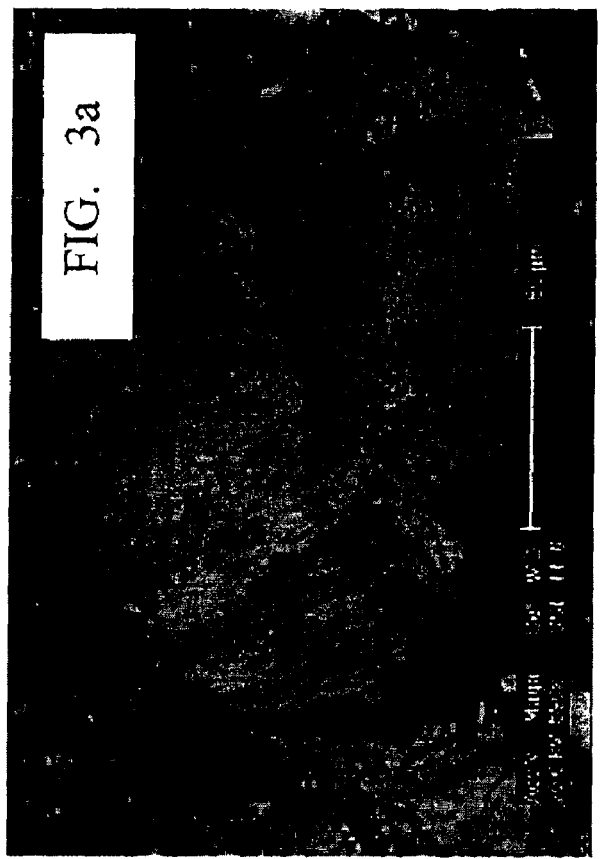

The micrograph in FIG. 3a shows a synthetic rutile particle and lots of veins which can be attributed to the removal of iron and potassium in the leaching process. The corresponding EDX in FIG. 3b has dominant peaks of Ti and O which suggest the formation of synthetic rutile and peaks attributable to the presence of potassium, calcium, magnesium and iron. Chemical analysis proved that the concentration of $TiO_2$ was 97 wt %. The remaining 3 wt % was made up of potassium, calcium and magnesium oxides.

(2) $Na_2CO_3$ Roasted Ore

Ilmenite ore was roasted with a stoichiometric proportion of $Na_2CO_3$ at 1123K for 4 hours. The roasted mass was then washed in water to remove soluble potassium ferrites, silicates and aluminates. The substantially insoluble residue that remained after washing was then subjected to leaching in a solution of oxalic and ascorbic acid in the reactor assembly 10 illustrated in FIG. 2. The pH of the solution was adjusted to 3 by the addition of NaOH. The temperature of the leaching solution was maintained at 70° C. The solution was stirred at a constant rate of 1300 rpm, and argon gas was passed into the solution at 300 ml min$^{-1}$. Leaching was carried out for 4 hours after which the residue was filtered and washed with 5% HCl solution.

Figure 4:
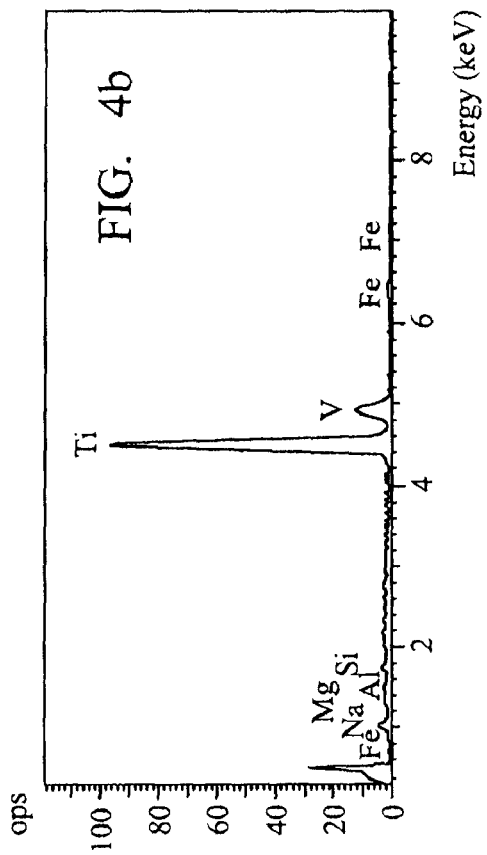
FIG. 4a is a microstructure showing particles after roasting with sodium carbonate followed by reduction leaching.
FIG. 4b is an EDX of the particle shown in FIG. 4a confirming the presence of titanium and oxygen.
Figure 4:
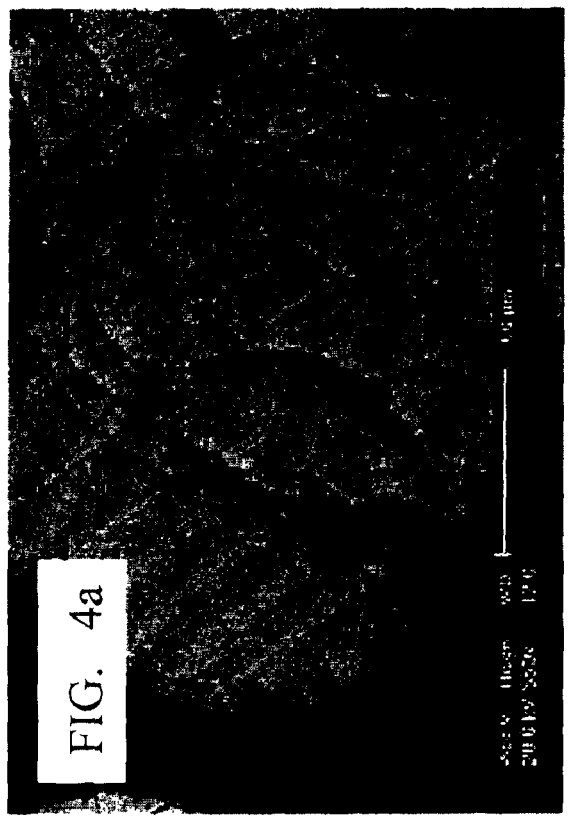
Figure 5:
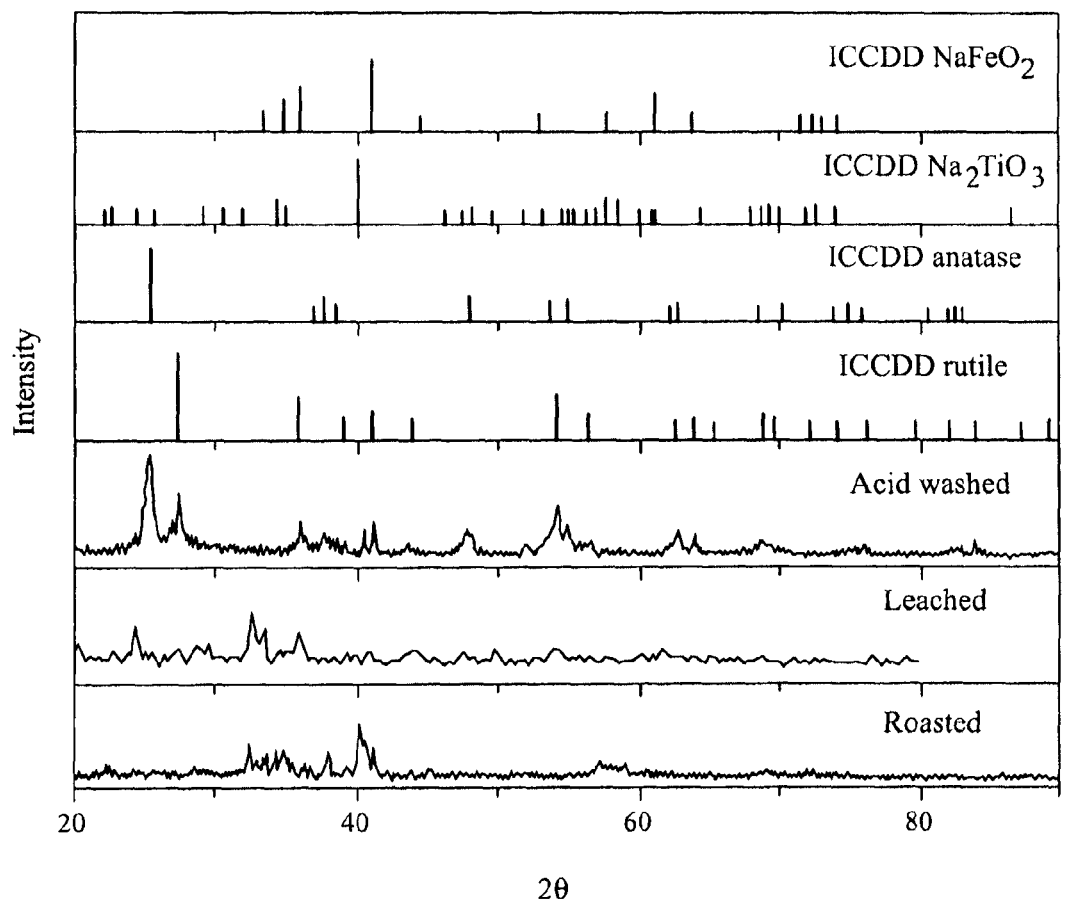
FIG. 5 illustrates diffraction patterns showing synthetic rutile and anatase obtained after the beneficiation of ilmenite ore.

Reduction leaching led to the formation of synthetic rutile having 94 wt % $TiO_2$ with the remainder containing sodium oxide, aluminium oxide, silicon dioxide and iron oxide. The backscattered image in FIG. 4a illustrates the beneficiated ore. The corresponding EDX in FIG. 4b shows dominant peaks of titanium and oxygen and small peaks of aluminium, silicon and iron. It was observed that by controlling the roasting and leaching conditions both synthetic anatase and rutile can be obtained. The diffraction pattern in FIG. 5 compares the roasted, leached and acid washed sample where it can be seen that the diffraction pattern of the acid leached sample exhibits both rutile and anatase peaks.

(3) $Li_2CO_3$ Roasted Ore

When reduction leaching was performed on ilmenite roasted with lithium carbonate, synthetic rutile was not produced due to the presence of stable lithium titanate.

Figure 14:
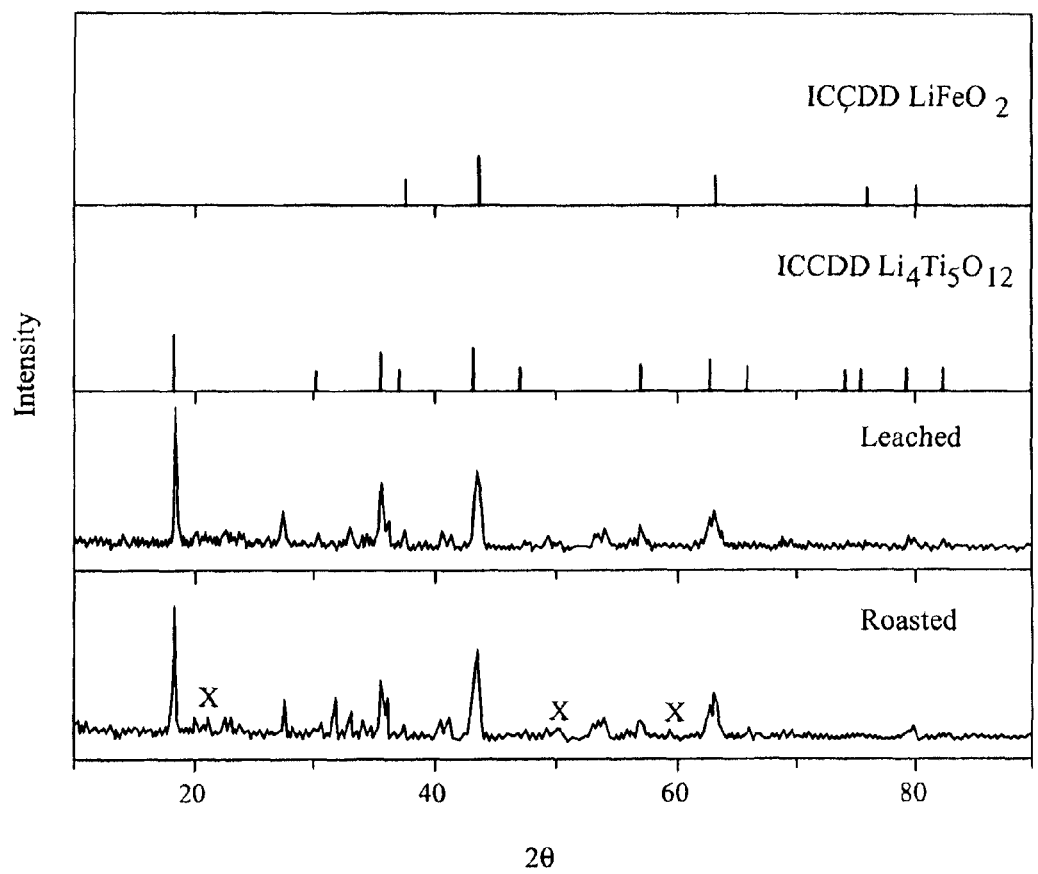
FIG. 14 is a diffraction pattern which compares roasted and leached product when ilmenite was roasted with lithium carbonate followed by reduction leaching.

FIG. 14 compares diffraction patterns for the roasted and leached products for the lithium system. It is evident that after reduction leaching there is no difference in the lithium titanate peaks. However goethite peaks marked as 'x' in the roasted product are missing in the leached sample which confirms that there was some removal of iron.

From the foregoing examples it can be seen that roasting of ilmenite with different alkali salts results in the formation of alkali titanate which can be leached with organic acid to produce synthetic rutile.

Although two different types of leaching were performed, reductive leaching resulted in better removal of iron and alkali salt. The primary condition of leaching was to maintain the pH below 4 and therefore the choice of the organic compounds was crucial. Ascorbic acid converts $Fe^{3+}$ to $Fe^{2+}$ which then reacts with oxalic acid to form iron oxalate and dissolves in the solution. Oxalic acid is a weak acid and therefore does not dissociate readily in water. This helps to maintain the pH of the solution between 3 and 4. Oxalic acid also reduces $Fe^{3+}$ to $Fe^{2+}$ and forms iron oxalate directly. In the presence of ascorbic acid, the reduction of iron starts as early as 15 minutes into the leaching process. The acid solution also removes alkali to produce synthetic rutile at a concentration greater than 97 wt % $TiO_2$.

EXAMPLE 2

Role of Ferrihydrite in the Leaching and Separation of Rare-Earth Oxide Impurities

TABLE 3

Chemical composition of magnetic and non-magnetic fractions of ilmenite ore in wt %

| Chemical composition | Magnetic ilmenite | Non magnetic ilmenite |
|---|---|---|
| $TiO_2$ | 61 | 75.6 |
| FeO | 28.4 | 0.1 |
| $Fe_2O_3$ | 8.4 | 15.5 |
| $Al_2O_3$ | 0.5 | 1.2 |
| MgO | 0.2 | 0.4 |
| $Mn_3O_4$ | 0.2 | 0.3 |
| CaO | 0.1 | 0.1 |
| $SiO_2$ | 1.2 | 2.2 |
| $P_2O_5$ | 0.7 | 0.9 |
| $Cr_2O_3$ | 0.2 | 0.2 |
| $CeO_2$ | 0.2 | 0.9 |
| $La_2O_3$ | 0.0 | 0.3 |
| LOI at 1100° C. | 1.05 | 1.7 |

Figure 15:
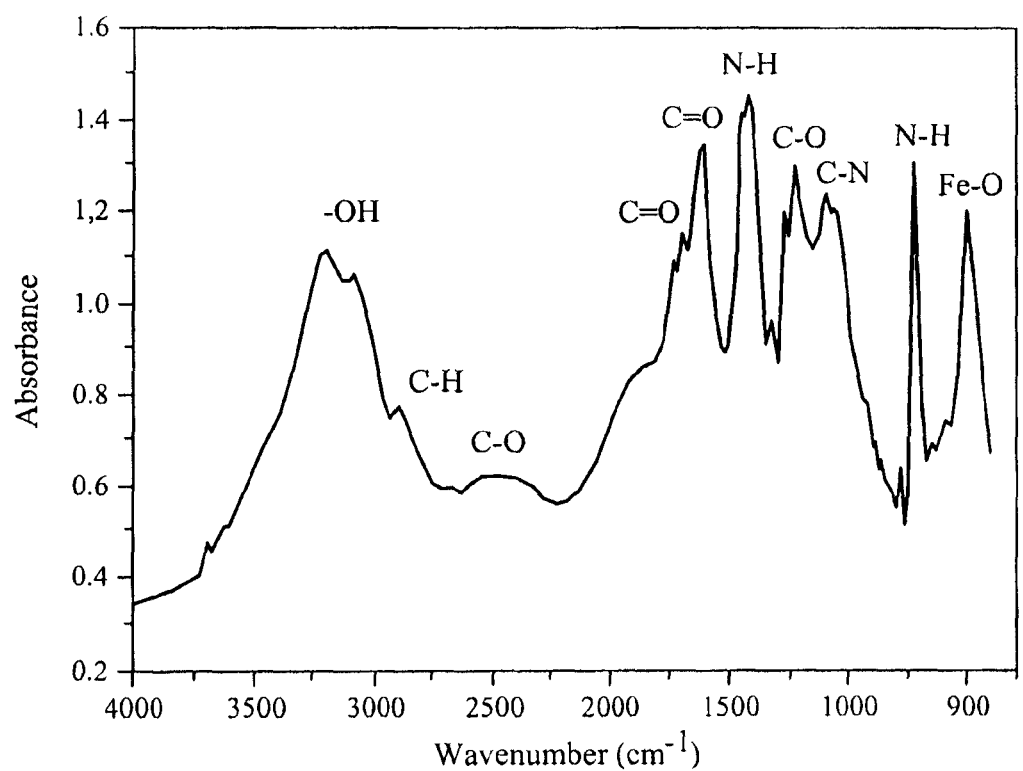
FIG. 15 is an FTIR of a ferrihydrite containing sample obtained after differential dissolution.

A differential dissolution technique (Schwertm. U 1973 "Use of Oxalate for Fe Extraction from Soils" Canadian Journal of Soil Science 53(2): 244-246; Jambor, J. L. and Dutrizac, J. E. (1998). "Occurrence and constitution of natural and synthetic ferrihydrite, a widespread iron oxyhydroxide" Chemical Reviews 98(7): 2549-2585) was carried out in a dark room by shaking the solution for 2 hours at room temperature after which the iron content in the solution was ascertained from atomic absorption analysis. Oxalic acid was added during the differential dissolution process to maintain the pH at 3. It was shown that ferrihydrite or poorly crystalline iron oxides are readily soluble in ammonium oxalate solution at pH 3 whereas goethite and hematite are much more resistant. It was found that the solution of ammonium oxalate contained 54 ppm of iron thus proving the presence of ferrihydrite. Further presence of ferrihydrite was confirmed by performing an FTIR on the dried sample obtained after the differential dissolution process. The FTIR of the sample is presented in FIG. 15 and shows distinctive peaks for oxalic acid and ammonium oxalate. Two OH stretching bands observed at 3000 and 3200 $cm^{-1}$ are attributable to the carboxylic group and hydrated water in ammonium oxalate. The C=O and C—O stretching bands at 1700 $cm^{-1}$ and 1230 $cm^{-1}$, respectively, are attributable to the carboxylic acid group. The N—H and C=O bond stretching bands at 1409 $cm^{-1}$ and 1595 $cm^{-1}$ are due to the presence of ammonium oxalate. However the Fe—O stretching band is present at 490 $cm^{-1}$ which confirms the formation of iron oxalate. Iron oxalate cannot form at room temperature by dissolving hematite in oxalic acid (see Taxiarchou, M., Panias, D., Douni, I., Paspaliaris, I. and Kontopoulos, A. (1997). "Dissolution of hematite in acidic oxalate solutions" Hydrometallurgy 44(3): 287-299). Thus the above analysis points to the presence of ferrihydrite in ilmenite ore which is responsible for the leaching of iron from the ilmenite lattice in the natural environment and the formation of pseudobrookite.

It was important to characterize the iron hydroxyl-oxide phase as the formation of such phases in laboratory scale would assist in easy removal of iron in the leaching stage. The other important characteristic of ferrihydrite is that it has a large surface area and exists as nanoparticles with high adsorption capacity. Ferrihydrite is also stable at pH 4 to 7 making it ideal for processing minerals.

Adsorption of Impurities on Ferrihydrite

Figure 16:
FIG. 16 illustrates colloidal residue which was collected from filter paper and is predominantly rich in rare-earth oxides.

When ilmenite was roasted with a potassium salt (e.g., KOH at 1023K for 4 hours), a major structural stress developed within the ilmenite lattice leading to macroscopic fracture in ilmenite grain. Such a macroscopic change in chemical reaction led to the liberation of dispersed rare earth oxides in the matrix of ilmenite. Once liberated, these particles formed a colloidal layer and floated on the surface of water when the roasted material was treated with cold distilled water. FIG. 16 shows the colloidal residue which was collected from the filter paper, and it is predominantly rich in rare-earth oxides.

The colloidal layer was filtered and analysed using XRF. Due to unavailability of rare earth oxide standards, a semi quantitative XRF analysis was performed. Table 4 lists the chemical composition of the colloidal layer.

TABLE 4

Semi-quantitative chemical composition of the colloidal layer floating on the surface of water after roasting ilmenite ore with KOH. $FeO \cdot TiO_2:KOH = 1:2.2$

| Elements | Concentration (% wt) | Elements | Concentration (% wt) |
|---|---|---|---|
| Ca | 69.8 | Cu | 0.44 |
| La | 5.72 | Mg | 0.358 |
| Ce | 5.35 | Sm | 0.13 |
| Si | 5.05 | Al | 0.12 |
| Th | 3.82 | Ni | 950 ppm |
| Nd | 2.97 | Nb | 860 ppm |
| Pr | 1.86 | Gd | 840 ppm |
| P | 1.72 | Ti | 460 ppm |
| Y | 0.642 | V | 420 ppm |
| Zn | 0.594 | Cr | 250 ppm |
| Fe | 0.531 | Cl | 160 ppm |
| Zr | 0.468 | S | 110 ppm |

It is evident from Table 4 that there is a high concentration of calcium, lanthanum and cerium and a small concentration of phosphorus and iron. The presence of phosphorous and rare earth oxides is indicative of the mineral co-existence of monazite which is often associated with rare-earth bearing ilmenite.

Figure 17:
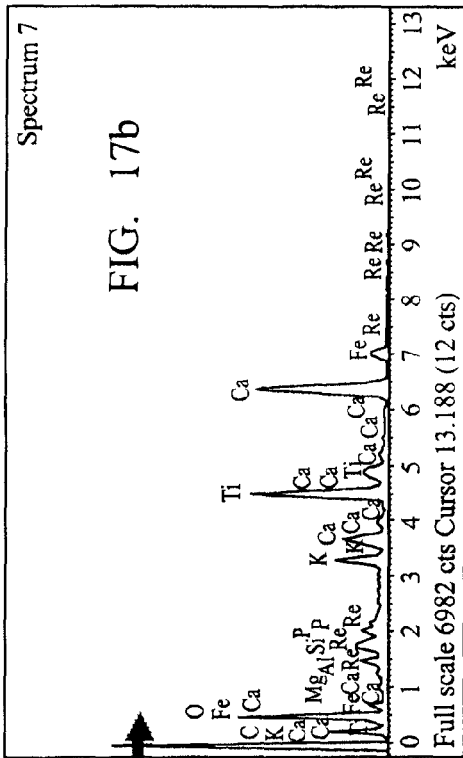
Figure 17:
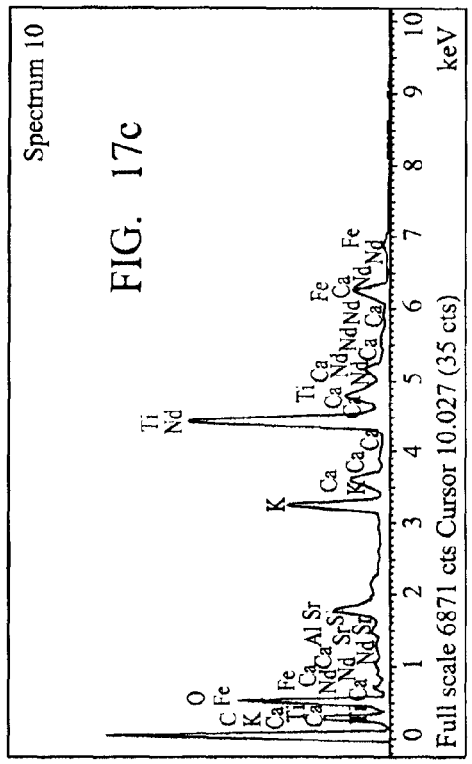
Figure 17:
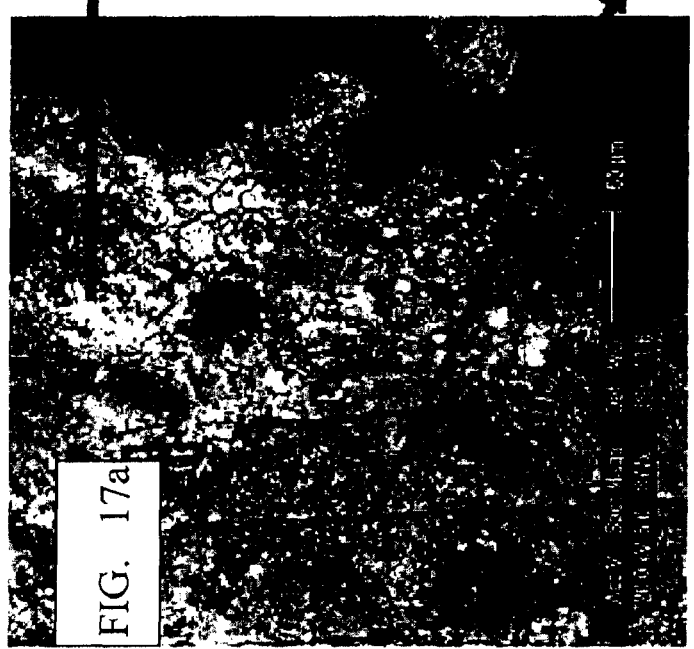

The colloidal layer (FIG. 16) was analysed using SEM. The backscattered image in FIG. 17a shows two distinct phases. The EDX of the bright phase in FIG. 17b confirms the presence of iron, calcium, titanium, phosphorus and cerium phases. The EDX for the dark grey phase shown in FIG. 17c is predominantly titanium, potassium and a whole range of rare-earth oxides. Smaller peaks of strontium suggest that the perovskites of strontium co-exist with Ca.

Comparing FIGS. 17b and 17c, it is evident that phosphorus and rare earth oxide phases co-exist with iron-rich phases. This might be due to the prevalence of ferrihydrite or hydroxy oxides of iron which are abundant under neutral to strong pH under oxidising condition. From the various analyses it could be said that ferrihydrite present in ilmenite ore is responsible for the leaching of iron from the ilmenite lattice thereby increasing the concentration of $TiO_2$ in the ore.

Influence of Bicarbonates and Hydroxides

Table 5 presents the results of a comparison of the removal of iron from magnetic and non magnetic fractions of ilmenite after roasting with $Na_2CO_3$, $NaHCO_3$ and NaOH followed by water washing. It is evident that the reaction with sodium hydroxide improves the removal of iron much more than the other sodium compounds. The increase in iron removal is due to the numerous cracks grown in the ilmenite grain during roasting (see FIG. 18). These cracks increase the conversion from ilmenite to corresponding sodium titanate and sodium ferrite.

Both the hydroxide and bicarbonate have OH⁻ groups within the structure. Their presence promotes the formation of ferrihydrite which otherwise is impossible to form. This is why the kinetics of reaction are much slower with $Na_2CO_3$ compared with NaOH and $NaHCO_3$.

TABLE 5

Percentage removal of iron when two fractions of the ore were treated with different alkali salts

| | Magnetic fraction of ilmenite ore in wt % | Non magnetic fraction of ilmenite ore in wt % |
|---|---|---|
| Initial concentration of iron in the ore. | 25.3 | 11.1 |
| Removal of iron when ore treated with stoichiometric amount of sodium carbonate and washed in water. | 12.5 | 43.8 |
| Removal of iron when ore treated with stoichiometric amount of sodium bicarbonate and washed in water | 14.3 | 43.8 |
| Removal of iron when ore treated with stoichiometric amount of sodium hydroxide and washed in water. | 16.4 | 50.4 |

The reason for the change in the structure can be explained on the basis of the following decomposition reactions. The protons from the electrolytic (galvanic) dissociation of $H_2O$ diffuse much more rapidly than the alkali ions. The resultant change in the volumes of titanate and ferrite crystallites with protons is much larger than in the absence of protons.

Decomposition of alkali salts takes place via the following reactions:

$$2NaOH(s) = Na_2O(s) + H_2O(g) \quad [1]$$

$$4NaHCO_3 = 2Na_2CO_3 + 2H_2O(g) + 2CO_2(g) \quad [2]$$

Further, steam generated from the above reactions dissociates as follows:

$$H_2O(g) = H^+ + OH^- \quad [3]$$

The presence of hydroxyl groups with alkali accelerates attack by providing protons ($H^+$ ions) in the lattice to compensate for the charge deficiency due to the diffusion of $Na^+$ ions which replaces the $Fe^{2+}$ sites. Since a proton is much smaller in size than an alkali ion, the diffusion is much more rapid which allows reaction to commence at lower temperature.

Effect of Potassium Salts

Figure 19:
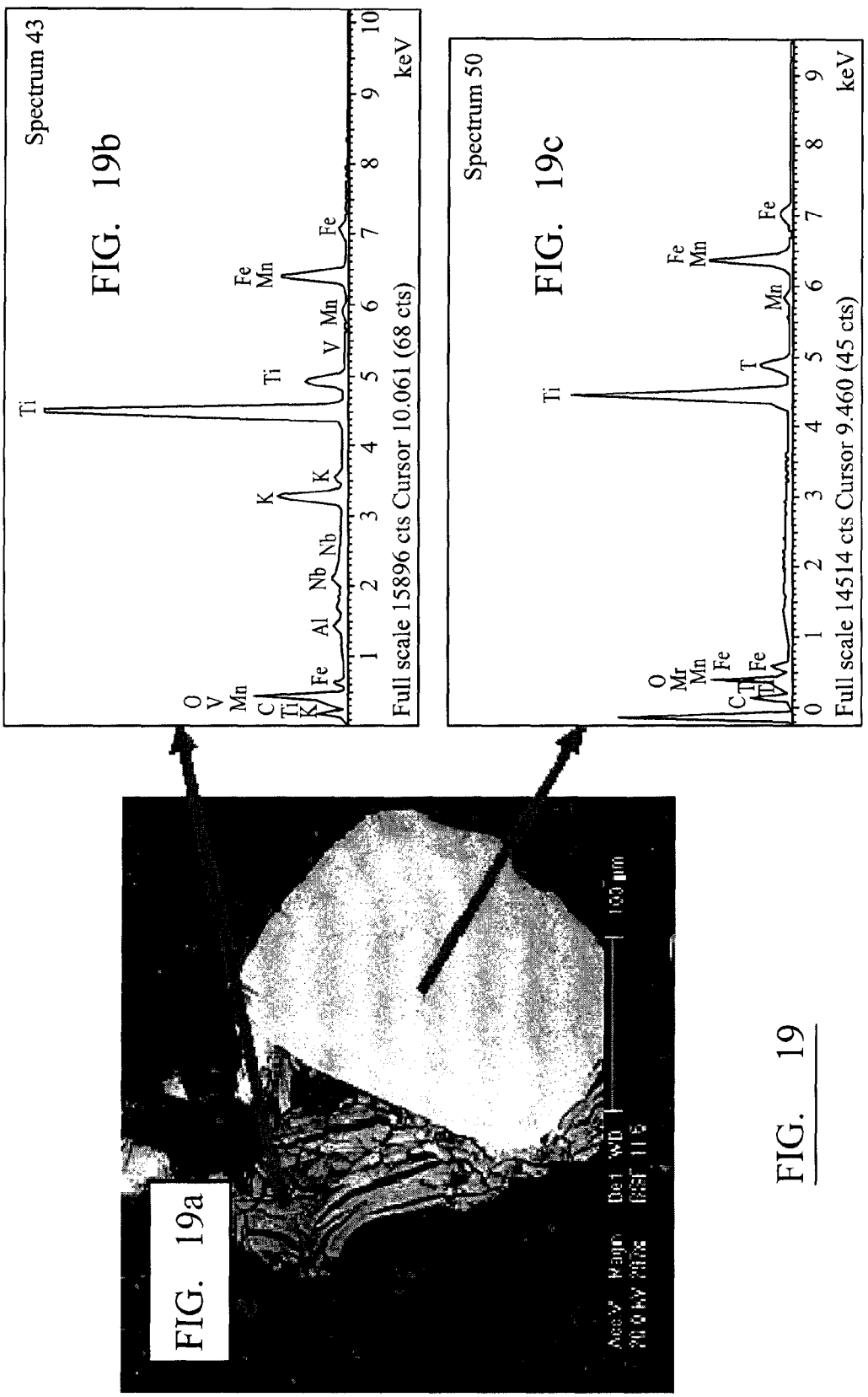
FIG. 19a is a partially reacted ilmenite grain after roasting with potassium carbonate for 60 minutes.
FIG. 19b is an EDX of product layer showing the formation of potassium titanate and ferrite.
FIG. 19c is an EDX of unreacted ilmenite grain.

When ilmenite was roasted with potassium carbonate, bicarbonate and hydroxide, there was breaking of the product layer to numerous fragments as seen in FIG. 19. As $K^+$ ions diffuse into the ilmenite lattice, a strain is created proportional to the concentrations of $H^+$ and $K^+$ which is too large to be accommodated within the lattice structure. Thus the product layer of potassium titanate and ferrite cracks. Samples collected at intermediate stages of roasting showed the same phenomenon. FIG. 19 illustrates that the product layer of potassium titanate and ferrite had already fragmented after one hour of the roasting process. The EDX in FIG. 19b represents the reacted ilmenite grain showing potassium, titanium and oxygen peaks, whereas FIG. 19c confirms the unreacted core of ilmenite showing iron, titanium and oxygen peaks. However, due to the extensive fragmentation of the ilmenite grain, the reaction between ilmenite and potassium carbonate led to an increase in removal of iron which was established by analysing the iron content after roasting and water leaching. Table 6 compares the removal of iron when both fractions of ilmenite were roasted with lithium, sodium and potassium carbonates.

TABLE 6

Removal of iron for both magnetic and non magnetic fractions of ilmenite after roasting with different alkali salts followed by water leaching

| | Magnetic fraction of ilmenite ore in wt % | Non magnetic fraction of ilmenite ore in wt % |
|---|---|---|
| Initial concentration of total iron in the ore. | 25.3 | 11.1 |
| Removal or iron when ore was treated with lithium carbonate and washed in water. | 0 | 0 |
| Removal of iron when ore was treated with sodium carbonate and washed in water. | 12.5 | 43.8 |
| Removal of iron when ore was treated with potassium carbonate and washed in water. | 18.3 | 47.1 |

From Table 6 it is evident that removal of iron is maximised when roasting is carried out with potassium carbonate. There is no removal of iron in the case of lithium carbonate due to the formation of stable lithium titanate and ferrite. Removal of iron in the case of roasting with sodium carbonate is higher than that with lithium carbonate but lower than that with potassium carbonate. Iron removal also depends on the solubility of the different ferrites in water. Lithium ferrite is not water soluble, and no removal of iron was apparent during the water washing stage.

Due to the unavailability of rare earth oxide standards, such as Nd, U and Th, suitable oxide markers phosphorus pentoxide, alumina, cerium and lanthanum oxides were chosen. Table 3 indicates that the non magnetic fraction of the ilmenite ore had higher concentrations of rare earth oxides and was used for investigating the maximum removal when treated with potassium salts. Table 7 compares the list of markers used for quantifying the rare earths oxides in the magnetic and non magnetic fractions of the ore. Comparing the concentrations of rare earth oxides in Tables 3 and 7, it is evident that the concentrations are not the same. This can arise because the concentrations of rare earth oxides are not uniformly spread in the ilmenite mineral. However, Table 7 shows the same trend that the concentrations of rare earth oxides are higher in the non magnetic fraction of the ilmenite ore compared to the magnetic fraction.

TABLE 7

Rare earth oxides present in magnetic and non magnetic fractions of ilmenite ore

| | $CeO_2$ (wt %) | $La_2O_3$ (wt %) | $Al_2O_3$ (wt %) | $P_2O_5$ (wt %) |
|---|---|---|---|---|
| Magnetic ilmenite | 0.356 | 0 | 1.369 | 0.031 |
| Non magnetic ilmenite | 1.969 | 0.274 | 1.838 | 0.418 |

After roasting the non magnetic fraction of ilmenite ore with potassium hydroxide followed by a water leaching step, the material obtained was analysed using XRF. Table 8 compares the concentrations of rare earths oxides in treated non magnetic fraction with the untreated fraction. It is evident from Table 8 that 80 wt % of rare earth oxides was removed by roasting the non magnetic fraction of ilmenite ore with potassium hydroxide followed by water leaching.

TABLE 8

Comparison of concentrations of rare earth oxides in the initial and treated samples of non magnetic fractions of ilmenite ore

| | $CeO_2$ (wt %) | $La_2O_3$ (wt %) | $Al_2O_3$ (wt %) | $P_2O_5$ (wt %) |
|---|---|---|---|---|
| Non magnetic fraction of ilmenite ore | 1.969 | 1.917 | 0.274 | 0.418 |
| Treated non magnetic fraction of ilmenite ore | 0.374 | 0.010 | 0.117 | 0.00 |

EXAMPLE 3

Particle Size and Purity of Synthetic Rutile

TABLE 9

Chemical compositions of various ores in wt %

| Chemical composition | Ilmenite Bomar | Anatase |
|---|---|---|
| $TiO_2$ | 69.25 | 56.3 |
| FeO | 15.2 | 0 |
| $Fe_2O_3$ | 6.1 | 18.4 |
| $Al_2O_3$ | 2.4 | 6.8 |
| MgO | 0.9 | 1.2 |
| $Mn_3O_4$ | 0.4 | 0.35 |
| CaO | 0.1 | 1.7 |
| $SiO_2$ | 3.8 | 3.9 |
| $P_2O_5$ | 0.3 | 5.6 |
| $Cr_2O_3$ | 0.2 | 0.2 |
| $CeO_2$ | 0.7 | 1.6 |
| $La_2O_3$ | 0.3 | 0.6 |
| LOI at 1100° C. | 0.8 | 5.15 |

Particle size is affected by most of the operational parameters within the alkaline roasting and reductive leaching steps. Unreacted Bomar ilmenite (see Table 9) has a particle size ranging from 100-450 μm which, when mixed with the alkali salt at elevated temperatures, reacts and binds within the grains.

The alkali salt selected for the reaction influences greatly the resulting size of the reacted ilmenite grains. Lithium, sodium and potassium salts behave in a similar manner by forming a product layer through which the alkali ions tend to diffuse toward the unreacted core (see FIGS. 18 and 20).

Lithium salts have an ionic radius of 0.68 Å which falls between the ionic radius of $Fe^{2+}$ and $Fe^{3+}$ (0.64-0.74 Å). Being comparable in size with Fe-ions, lithium ions diffuse fastest, but the resulting reaction product is not soluble in water and does not facilitate preferential separation between alkali-rich titanate and alkali-complexed iron oxides. By comparison, sodium ion ($Na^+$) has an ionic radius of 1.02 Å which is greater than that of $Fe^{2+}/Fe^{3+}$ and $Ti^{4+}$ (0.68 Å). The ionic size difference between alkali and parent cations of the ilmenite lattice creates much greater strain between the product layer (see FIGS. 20a-d and 18) and the mineral lattice. Consequently, cracks form as the reaction continues with time. The cracks become more prevalent over shorter periods at higher roasting temperatures due to a larger diffusion speed of cations in the mineral and product layer lattices.

Figure 20:
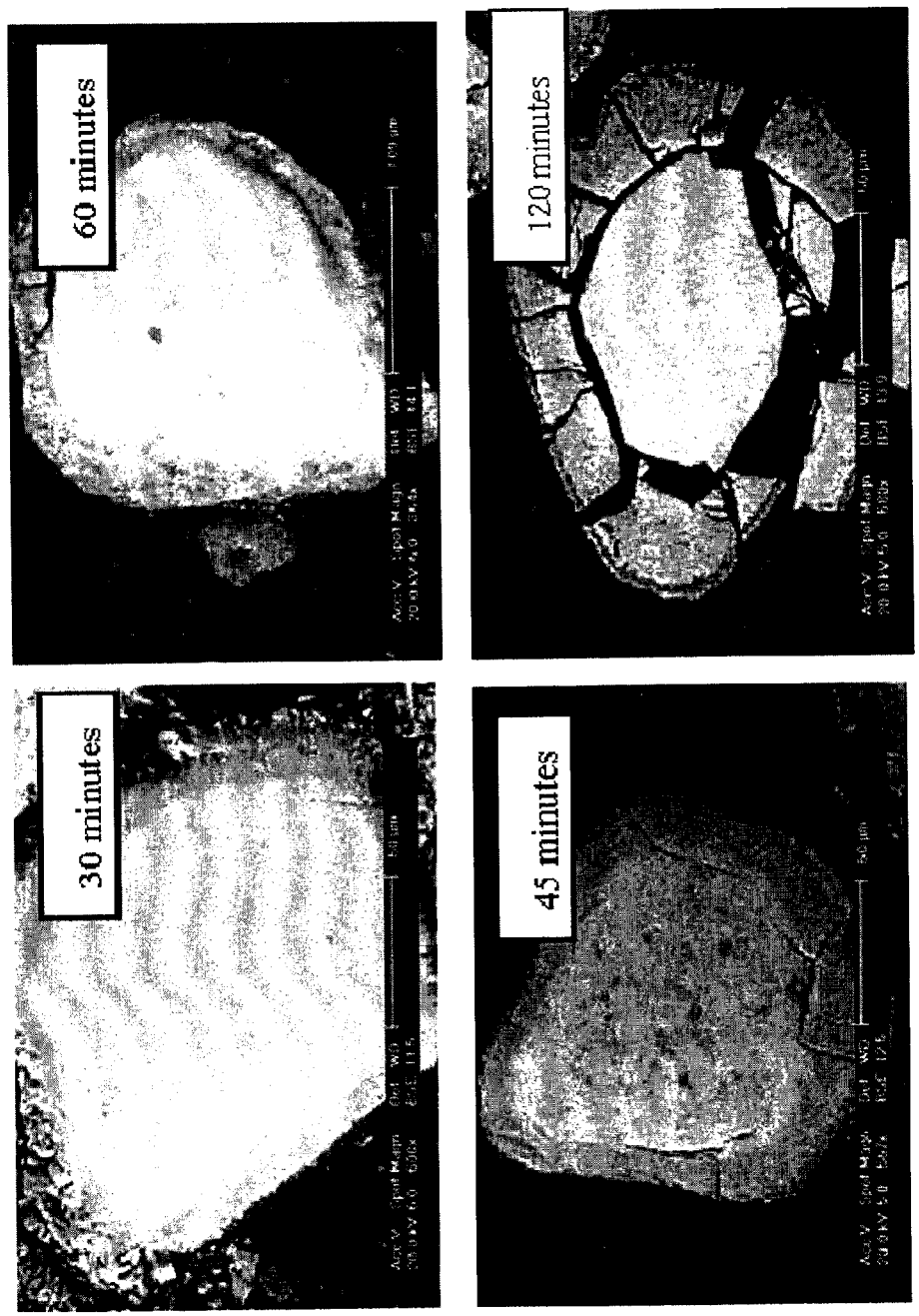
FIG. 20 is a cross-sectional scanning electron micrograph which shows cross-sectional images of ilmenite after a roasting reaction with sodium carbonates in air at 1123K. The peripheral product layer (sodium titanate/ferrite) grows in thickness with time.

The effect of time on the formation of product layer of alkali titanate is explained with reference to FIG. 20 in which the thickness of the peripheral layer grows with increasing time. The unreacted core is ilmenite. Upon reaching a critical thickness the peripheral layer cracks and renews a fresh layer for roasting reaction between alkali and ilmenite. Therefore, the alkali ion diffusion into the ilmenite structure is an important step in the mineral beneficiation process.

Potassium ion ($K^+$) has the largest ionic radius size of 1.38 Å which is why the reaction-induced strain between the ilmenite lattice and the product layer is the largest among the three alkali ions and contributes to rapid cracking of the product layer (see FIG. 18). This exposes unreacted ilmenite grain below the surface which further supports the conclusion that surface renewal via cracking of the product layer is the prevalent mechanism for product layer formation and its disintegration during alkali roasting of ilmenite in air. The effect with potassium salts is more vivid than with sodium salts as can be seen by comparing FIGS. 20a-d with FIG. 18. In FIG. 18, the size of the fragments of product layer appear much smaller than in FIG. 20d.

Elevated temperature and longer reaction times for roasting also break the ilmentite grains further. Reaction becomes more efficient as the temperature increases until the initiation of the melting point. Once the solid outer layer begins to melt, the reaction is deprived of oxygen and consequently the formation of alkali titanates/ferrites is severely limited.

EXAMPLE 4

Controlled Leaching after Roasting with K/Na Bicarbonate or Hydroxide

The removal of impurities, such as oxides of iron, aluminium, silicon and rare-earth, can further contribute to the reduction in particle size of ilmenite. This is mostly affected by the kinetics of oxidative and reduction leaching. The kinetics of oxidative leaching were studied at room temperature whereas the reduction leaching was studied between 313K and 353K. The reaction rate has been shown to nearly double every 293K increase above room temperature to a maximum at 373K.

Unreacted ilmenite grains can take days to break under organic acid dissolutions. Consequently, by limiting the reaction during roasting, it may be possible to preserve particle size by compromising the overall residual concentration of impurity oxides. This is evidenced by demonstrating the seams of weathered ilmenite which are preferentially beneficiated after four hours with sodium hydroxide at 500° C. Leaching was performed at pH 2.6 under anaerobic conditions at 65° C. while the solution was stirred at 500 rpm for four hours.

The oxide seams shown in FIG. 21a are normally made up of a mix of ferrihydrite and hematite which are highly defective and react preferentially during roasting. Areas around the seams and outer layers are generally the richest in rare earth materials and impurities. In these areas leucoxene forms in amorphous to crypto-masses which are unstable due to the charge difference of the iron leaving the lattice. The balance requirement of the lattice means it must be stabilized with impurities such as $Al_2O_3$, $Cr_2O_3$, $SiO_2$, $V_2O_5$ and $Na_2O$.

FIG. 21a shows a cross section of a weathered ilmenite grain. The iron has leached out of the ilmenite grain through weathering and formed hematite layers across the grain. FIG. 21b is an image of the final product after both reaction stages. The acid has attacked only the already activated iron seams within the grain. By only performing a partial reaction, a large proportion of the impurities can be removed while maintaining the particle size around 100-200 µm. However, during these partial reactions rare earths and other impurities are often left behind on the surface. If silica, alumina or cerium is not removed during initial roasting, the reductive leach will have little effect on this material. In the case of cerium, crystallization occurs on the surface of ilmenite grains during leaching. The material not removed during roasting is mobilized during the leaching stage and nucleates forming crystals of impurities across the surface.

Partial roasts also produce a large quantity of residual alumina and silica grains in the product. Leaching has next to no effect on these materials achieving 0.2% dissolution over one hour.

EXAMPLE 5

Formation of High Purity (>97 wt %) Rutile and Particle Size

Nearly pure titanium dioxide can be achieved through a two-step process but at the expense of the original particle size. This is achieved by simply using an efficient roasting process which results in particle size reduction (see FIGS. 18 and 20) in which significant particle liberation is expected. By utilizing an elevated roasting temperature (e.g., above 823K), potassium bicarbonate salt reacts rapidly with ilmenite and releases rare-earth, silicate and zircon impurities.

Figure 22:
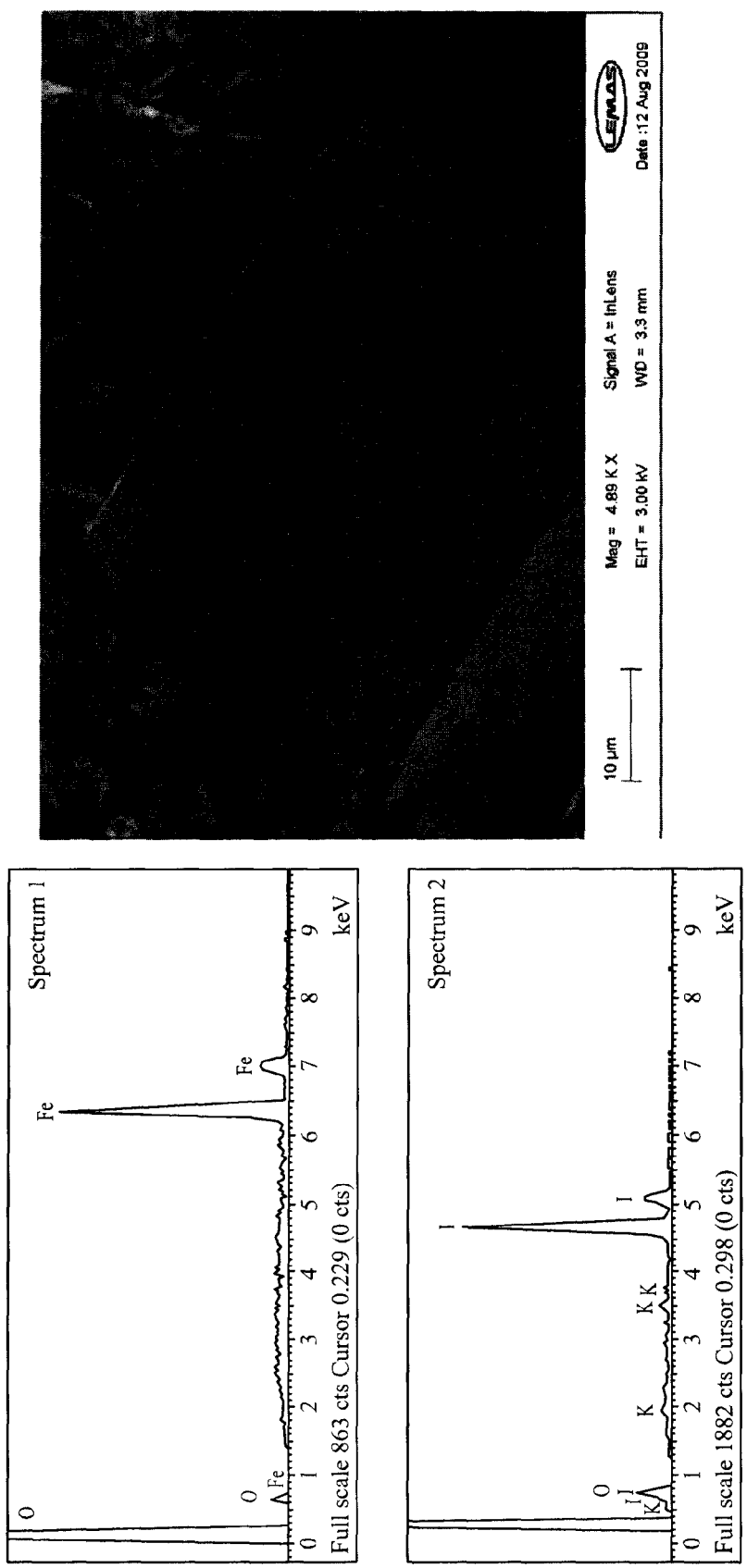
FIG. 22 is an EDX spectrum (top left) showing iron only from the cubic structure (iron oxide) occasionally seen in a matrix of rutile particles in the background for which the EDX shows only traces of K. This material appears beige white in colour and is quite fine as indicated by the micron bar in the SEM image.

During leaching in anaerobic conditions with oxalic and ascorbic acids, the titanium dioxide falls from suspension while the iron nucleates and forms cubic crystal structures (FIG. 22). Although thermo-chemistry does not predict the presence of a solid $Fe^{2+}$ bearing solid phase which is rather unexpected, it does entail that in the vessel pH may be rising above 4 locally to cause the nucleation of hydroxy-oxide of iron as shown in FIG. 6. The speed and type of crystal formation depends on concentration, pH, temperature, speed of oxidation and impurities present in solution. Under the leaching conditions there are four main compounds that are commonly formed. These are hematite, goethite, lepidocrocite and ferrihydrite. The titanium dioxide is flaky compared with the cube-like structures of iron oxides in FIG. 22.

What is claimed is:

1. A process for recovering a titanium dioxide product from a titanium oxide-containing roasted mass comprising:
    (a) subjecting the titanium oxide-containing roasted mass or a substantially water-insoluble residue thereof to leaching in an organic acid solution which is a mixture of oxalic acid and ascorbic acid to produce an acid leachate and the titanium dioxide product.

2. A process as claimed in claim 1 wherein the titanium oxide-containing roasted mass is the product of roasting a titanium oxide-containing composition, wherein the titanium oxide-containing composition is an ore selected from the group consisting of ilmenite, anatase and perovskite.

3. A process as claimed in claim 1 or claim 2 wherein step (a) is preceded by:
    (a0) providing a titanium oxide-containing composition with one or more alkali salts to produce a charge; and
    (a01) oxidatively roasting the charge to produce the titanium oxide-containing roasted mass.

4. The process as claimed in claim 3 wherein the charge is without an alumina-containing additive and a calcium oxide-containing additive.

5. The process as claimed in claim 3 wherein the one or more alkali salts is a potassium salt.

6. The process as claimed in claim 3 wherein the one or more alkali salts is an OH-containing salt.

7. The process as claimed in claim 3 wherein the one or more alkali salts is a hydroxide or bicarbonate.

8. The process as claimed in claim 1 wherein in step (a) the titanium oxide-containing roasted mass comprises particles and the particles are in suspension in the organic acid solution.

9. A process as claimed in claim 8 wherein in step (a) the organic acid solution is at a pH of 4 or less.

10. A process as claimed in claim 9 wherein in step (a) the organic acid solution is at a pH in the range 3 to 4.

11. A process as claimed in claim 1 further comprising:
    (b) adding an alkaline solution to maintain the pH of the organic acid solution in the range 3 to 4.

12. A process as claimed in claim 1 wherein step (a) is carried out anaerobically.

13. A process as claimed in claim 1 wherein step (a) is preceded by:
    (a02) washing the roasted mass with an aqueous medium to produce an aqueous solution and a substantially insoluble residue of the roasted mass.

14. A process as claimed in claim 13 wherein the aqueous solution supports a colloidal layer rich in rare-earth oxides.

15. A process as claimed in claim 14 further comprising:
    (a03) isolating said colloidal layer from the aqueous solution; and
    (a04) recovering said rare-earth oxides from the colloidal layer.

16. A process as claimed in claim 15 further comprising:
    (c) washing the titanium dioxide product in a mineral acid.

17. A process as claimed in claim 1 or claim 16 wherein the titanium dioxide product consists essentially of $TiO_2$ with a purity of 92 wt % or more.

18. A process as claimed in claim 17 wherein the titanium dioxide product is in the form of synthetic rutile or synthetic anatase or a mixture thereof.

* * * * *